(12) United States Patent
Langtind

(10) Patent No.: US 12,718,312 B2
(45) Date of Patent: Aug. 25, 2026

(54) GRAPHICS PROCESSING WITH MEMORY ADDRESS DETERMINATION USING AN IDENTIFIER FOR A WORK ITEM

(71) Applicant: Arm Limited, Cambridge (GB)

(72) Inventor: Frank Klaeboe Langtind, Melhus (NO)

(73) Assignee: Arm Limited, Cambridge (GB)

( * ) Notice: Subject to any disclaimer, the term of this patent is extended or adjusted under 35 U.S.C. 154(b) by 112 days.

(21) Appl. No.: 18/613,282

(22) Filed: Mar. 22, 2024

(65) Prior Publication Data

US 2025/0299281 A1 Sep. 25, 2025

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
CPC ............ G06T 1/20; G06T 1/60; G06T 15/005
USPC ........................................................ 345/506
See application file for complete search history.

(56) References Cited

U.S. PATENT DOCUMENTS

2019/0012829 A1* 1/2019 Engh-Halstvedt ........ G06T 1/20

* cited by examiner

*Primary Examiner* — Jacinta M Crawford
(74) *Attorney, Agent, or Firm* — Pearl Cohen LLP

(57) ABSTRACT

When a graphics processor is executing a pipeline stage that generates a respective data element for each of a plurality of work items, the generated data elements are stored by storing one or more groups of N data elements in respective work item packets. When storing a data element for a work item, an identifier for the work item configured such that a first part of the work item identifier indicates an offset for the group of N data elements that the data element for the work item belongs to relative to a base address, and a second, different part of the work item identifier indicates the relative position of the data element for the work item within the group of N data, is used to determine a memory address at which to store the data element for the work item.

23 Claims, 13 Drawing Sheets

| Group | Row | | | | | Section |
|---|---|---|---|---|---|---|
| 65 | 25 | vtx2.attrib | vtx1.attrib | vtx0.attrib | | Varyings |
| | 26 | v5.attrib | vtx4.attrib | vtx3.attrib | v2.attrib | |
| | 27 | vtx7.attrib | vtx6.attrib | vtx5.attrib | | |
| | 28 | vtx10.attrib | vtx9.attrib | vtx8.attrib | | |
| | 29 | v13.attrib | vtx12.attrib | vtx11.attrib | v10.attrib | |
| | 30 | vtx15.attrib | vtx14.attrib | vtx13.attrib | | |
| 66 | 31 | vtx3.pos | vtx2.pos | vtx1.pos | vtx0.pos | Positions |
| | 32 | vtx7.pos | vtx6.pos | vtx5.pos | vtx4.pos | |
| | 33 | vtx11.pos | vtx10.pos | vtx9.pos | vtx8.pos | |
| | 34 | vtx15.pos | vtx14.pos | vtx13.pos | vtx12.pos | |
| | 35 | vtx3.spec.attrib | vtx2.spec.attrib | vtx1.spec.attrib | vtx0.spec.attrib | Special Attrib |
| | 36 | vtx7.spec.attrib | vtx6.spec.attrib | vtx5.spec.attrib | vtx4.spec.attrib | |
| | 37 | vtx11.spec.attrib | vtx10.spec.attrib | vtx9.spec.attrib | vtx8.spec.attrib | |
| | 38 | vtx15.spec.attrib | vtx14.spec.attrib | vtx13.spec.attrib | vtx12.spec.attrib | |
| | 39 | vtx2.attrib | vtx1.attrib | vtx0.attrib | | Varyings |
| | 40 | v5.attrib | vtx4.attrib | vtx3.attrib | v2.attrib | |
| | 41 | vtx7.attrib | vtx6.attrib | vtx5.attrib | | |
| | 42 | vtx10.attrib | vtx9.attrib | vtx8.attrib | | |
| | 43 | v13.attrib | vtx12.attrib | vtx11.attrib | v10.attrib | |
| | 44 | vtx15.attrib | vtx14.attrib | vtx13.attrib | | |
| 67 | 45 | prim3.spec_attrib | prim2.spec_attrib | prim1.spec_attrib | prim0.spec_attrib | Prim Spec Attrib |
| | 46 | prim7.spec_attrib | prim6.spec_attrib | prim5.spec_attrib | prim4.spec_attrib | |
| | 47 | prim11.spec_attrib | prim10.spec_attrib | prim9.spec_attrib | prim8.spec_attrib | |
| | 48 | prim15.spec_attrib | prim14.spec_attrib | prim13.spec_attrib | prim12.spec_attrib | |

FIG. 4 (Cont.)

| Row | | | | | Region |
|---|---|---|---|---|---|
| 49 | prim2.attrib | prim1.attrib | prim0.attrib | | Prim User Attrib (68) |
| 50 | p5.attrib | prim4.attrib | prim3.attrib | p2.attrib | |
| 51 | prim7.attrib | prim6.attrib | prim5.attrib | | |
| 52 | prim10.attrib | prim9.attrib | prim8.attrib | | |
| 53 | p13.attrib | prim12.attrib | prim11.attrib | p10.attrib | |
| 54 | prim15.attrib | prim14.attrib | prim13.attrib | | |
| 55 | prim3.spec_attrib | prim2.spec_attrib | prim1.spec_attrib | prim0.spec_attrib | Prim Spec Attrib |
| 56 | prim7.spec_attrib | prim6.spec_attrib | prim5.spec_attrib | prim4.spec_attrib | |
| 57 | prim11.spec_attrib | prim10.spec_attrib | prim9.spec_attrib | prim8.spec_attrib | |
| 58 | prim15.spec_attrib | prim14.spec_attrib | prim13.spec_attrib | prim12.spec_attrib | |
| 59 | prim2.attrib | prim1.attrib | prim0.attrib | | Prim User Attrib |
| 60 | p5.attrib | prim4.attrib | prim3.attrib | p2.attrib | |
| 61 | prim7.attrib | prim6.attrib | prim5.attrib | | |
| 62 | prim10.attrib | prim9.attrib | prim8.attrib | | |
| 63 | p13.attrib | prim12.attrib | prim11.attrib | p10.attrib | |
| 64 | prim15.attrib | prim14.attrib | prim13.attrib | | |

Polygon Packet
Positions
Varyings
Prim User Attrib
Prim User Attrib
91
94
97
98

521 vtx3.pos | vtx2.pos | vtx1.pos | vtx0.pos
522 vtx7.pos | vtx6.pos | vtx5.pos | vtx4.pos
523 vtx11.pos | vtx10.pos | vtx9.pos | vtx8.pos
524 vtx15.pos | vtx14.pos | vtx13.pos | vtx12.pos
525 vtx2.attrib | vtx1.attrib | vtx0.attrib
526 v5.attrib | vtx4.attrib | vtx3.attrib | v2.attrib
527 vtx7.attrib | vtx6.attrib | vtx5.attrib
528 vtx10.attrib | vtx9.attrib | vtx8.attrib
529 v13.attrib | vtx12.attrib | vtx11.attrib | v10.attrib
530 vtx15.attrib | vtx14.attrib | vtx13.attrib
531 prim2.attrib | prim1.attrib | prim0.attrib
532 p5.attrib | prim4.attrib | prim3.attrib | p2.attrib
533 prim7.attrib | prim6.attrib | prim5.attrib
534 prim10.attrib | prim9.attrib | prim8.attrib
535 p13.attrib | prim12.attrib | prim11.attrib | p10.attrib
536 prim15.attrib | prim14.attrib | prim13.attrib
537 prim2.attrib | prim1.attrib | prim0.attrib
538 p5.attrib | prim4.attrib | prim3.attrib | p2.attrib
539 prim7.attrib | prim6.attrib | prim5.attrib
540 prim10.attrib | prim9.attrib | prim8.attrib
541 p13.attrib | prim12.attrib | prim11.attrib | p10.attrib
542 prim15.attrib | prim14.attrib | prim13.attrib

FIG. 7 (Cont.)

Polygon Packet
Positions
Varyings
Positions

543 Packet Header
544 545 546 547 548 549 550 551 Primitive Meta Data
552 vtx0.pos vtx1.pos vtx2.pos vtx3.pos
553 vtx4.pos vtx5.pos vtx6.pos vtx7.pos
554 vtx8.pos vtx9.pos vtx10.pos vtx11.pos
555 vtx12.pos vtx13.pos vtx14.pos vtx15.pos
556 vtx0.attrib vtx1.attrib vtx2.attrib
557 v2.attrib vtx3.attrib vtx4.attrib v5.attrib
558 vtx5.attrib vtx6.attrib vtx7.attrib
559 vtx8.attrib vtx9.attrib vtx10.attrib
560 v10.attrib vtx11.attrib vtx12.attrib v13.attrib
561 vtx13.attrib vtx14.attrib vtx15.attrib
562 vtx0.pos vtx1.pos vtx2.pos vtx3.pos
563 vtx4.pos vtx5.pos vtx6.pos vtx7.pos
564 vtx8.pos vtx9.pos vtx10.pos vtx11.pos
565 vtx12.pos vtx13.pos vtx14.pos vtx15.pos 95
96
92

GRAPHICS PROCESSING WITH MEMORY ADDRESS DETERMINATION USING AN IDENTIFIER FOR A WORK ITEM

BACKGROUND

The technology described herein relates to graphics processing, and in particular to the handling of data when performing graphics processing.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles.

Each primitive is usually defined by and represented as a set of vertices, where each vertex typically has associated with it a set of "attributes", i.e. a set of data values for the vertex. These attributes will typically include position data and other, non-position data (varyings), e.g. defining colour, light, normal, texture coordinates, etc, for the vertex in question.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices.

Once primitives and their vertices have been generated and defined, they can be processed by the graphics processing system, in order to generate the desired graphics processing output (render target), such as a frame for display. This basically involves rendering the primitives to generate the graphics processing output.

The rendering process uses the vertex attributes associated with the vertices of the primitives that are being processed. To facilitate this operation, the vertices defined for the given graphics processing output (e.g. draw call) are usually subjected to an initial so-called "vertex shading" operation, before the primitives are rendered.

The vertex shading operation typically produces (transformed) vertex positions and one or more outputs explicitly written by the vertex shader. (Attributes output from the vertex shader other than position are usually referred to as "varyings".)

A graphics processing pipeline will typically therefore include one or more vertex shading stages (vertex shader(s)) that execute vertex shading operations, e.g. using the initial vertex attribute values defined for the vertices (and otherwise), so as to generate a desired set of output vertex attributes (i.e. appropriately "shaded" attributes) for use in subsequent processing stages of the graphics processing pipeline.

Once the vertex attributes have been shaded, the "shaded" attributes are then used when processing the vertices (and the primitives to which they relate) in the remainder of the graphics processing pipeline.

For example, the "vertex shaded" vertex positions and varyings may be used when rendering the primitives to provide the render output, for example when performing rasterisation and/or fragment shading operations. In the case of a tile-based graphics processing pipeline (where the two-dimensional render output (target) is rendered as a plurality of smaller area sub-regions, usually referred to as "tiles"), the vertex shaded (transformed) positions may be used to sort the primitives relative to the rendering tiles and/or to derive data structures for allowing the primitives to be sorted relative to the rendering tiles.

A vertex shading operation in a graphics processing pipeline will, accordingly, process one or more and typically a plurality of vertices (which can correspondingly be considered to be respective "work items" for the shading operation), to produce a respective "vertex shaded" attribute or attributes for each vertex (work item) that is processed (which attribute or attributes can correspondingly be considered to be respective data elements for the vertex (work item) in question).

Graphics processing pipelines can also include (shading) stages that generate per primitive data (attributes). In this case therefore, the shading stage in question can be considered to generate one or more data elements (being the primitive attributes or attributes in question) for each respective primitive (work item) that the shading stage processes.

Other shading stages of a graphics processing pipeline may correspondingly process respective work items and generate a respective data element or elements for each of the work items that they process.

When executing a graphics processing pipeline in which a stage or stages of the pipeline generate data for use by later stage(s) of the pipeline (such as vertex shading stage(s) generating vertex shaded vertex data that is then used by later (e.g. fragment shading) stages of the graphics processing pipeline), there is a need for the data generated by the stage(s) to be stored for use by other pipeline stage(s), and for those other pipeline stage(s) to be able to access that data appropriately.

The Applicants believe that there remains scope for improved handling of data in this regard when a graphics processor is executing a graphics processing pipeline.

BRIEF DESCRIPTION OF DRAWINGS

Embodiments of the technology described herein will now be described by way of example only and with reference to the accompanying drawings, in which.

Like reference numerals are used for like features in the Figures, where appropriate.

DESCRIPTION

Figure 1:
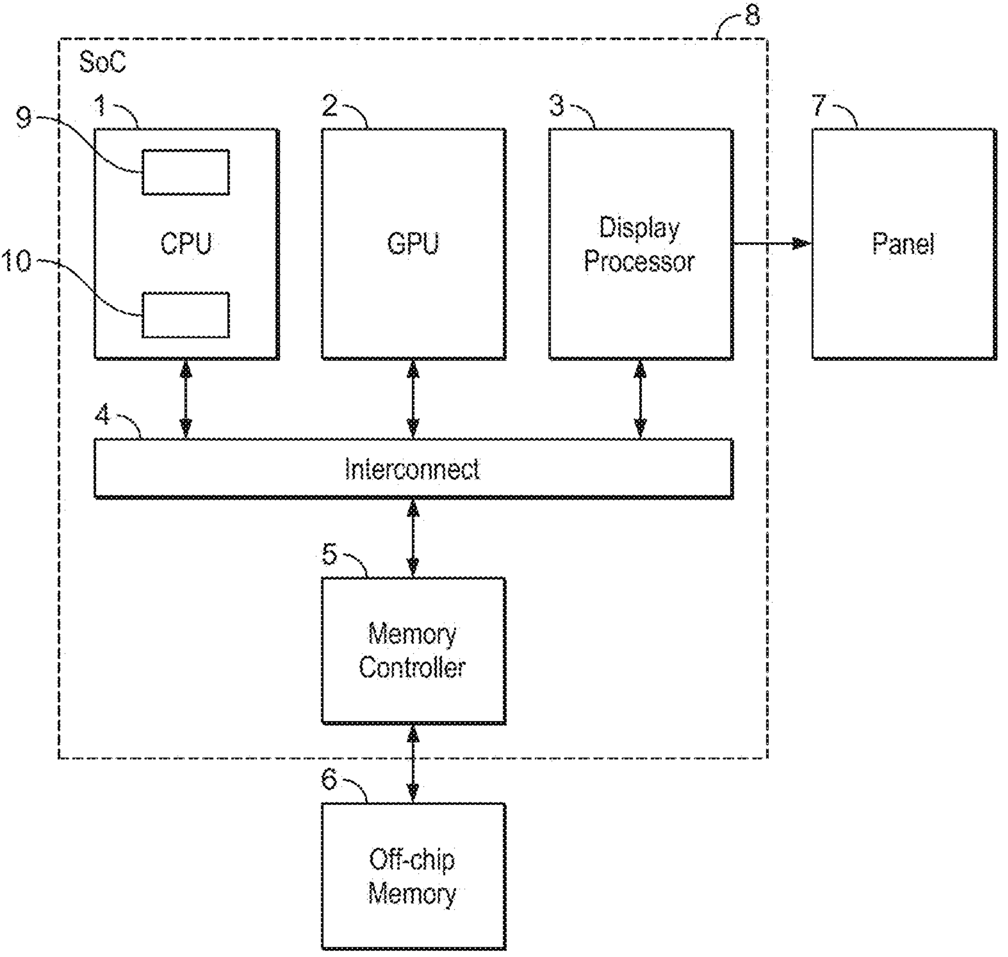
FIG. 1 shows an exemplary data processing system in which the technology described herein may be implemented.

A first embodiment of the technology described herein comprises a method of operating a graphics processor when executing a graphics processing pipeline to generate an output, the graphics processing pipeline being executed comprising a plurality of pipeline stages, the method comprising:

when the graphics processor is executing a pipeline stage that generates a respective data element for each of a plurality of work items being processed by the pipeline stage:

storing the generated data elements as one or more work item packets, each work item packet configured for storing data elements for a plurality of work items;

wherein the data elements in a work item packet are stored as one or more groups of N data elements in the work item packet;

the method further comprising, when storing a data element for a work item:

using an identifier for the work item configured such that a first part of the work item identifier indicates an offset for the group of N data elements that the data element for the work item belongs to relative to a base address, and a second, different part of the work item identifier indicates the relative position of the data element for the work item within the group of N data elements that the data element for the work item belongs to, to determine a memory address at which to store the data element for the work item; and storing the data element for the work item at the determined memory address.

A second embodiment of the technology described herein comprises a graphics processor operable to execute a graphics processing pipeline comprising a plurality of pipeline stages to generate an output, the graphics processor comprising:

a processing circuit configured to, when the graphics processor is executing a pipeline stage that generates a respective data element for each of a plurality of work items being processed by the pipeline stage:

store the generated data elements as one or more work item packets, each work item packet configured for storing data elements for a plurality of work items;

wherein the data elements in a work item packet are stored as one or more groups of N data elements in the work item packet;

and a processing circuit configured to, when storing a data element for a work item:

use an identifier for the work item configured such that a first part of the work item identifier indicates an offset for the group of N data elements that the data element for the work item belongs to relative to a base address, and a second, different part of the work item identifier indicates the relative position of the data element for the work item within the group of N data elements that the data element for the work item belongs to, to determine a memory address at which to store the data element for the work item; and a processing circuit configured to store the data element for the work item at the determined memory address.

The technology described herein in these embodiments relates to the storing of data when being generated by a processing stage of a graphics processing pipeline (e.g., and in an embodiment, for use by a subsequent stage(s) of the graphics processing pipeline).

In these embodiments of the technology described herein, a graphics processing pipeline stage, such as a vertex shading stage, that generates data elements for a set of work items (such as vertex attributes for vertices in the case of a vertex shading stage), stores its output data elements as respective packets comprising (data for) the work items (e.g. vertices) that it is generating data for. The data elements for the work items are stored as respective groups of N data elements within a packet.

The memory address where a data element for a work item should be stored is determined using an identifier for the work item that the data element relates to, which identifier is configured such that a first part (e.g., and in an embodiment, a set of one or more most significant bits) of the work item identifier indicates an offset for the group of N data elements that the data element for the work item belongs to relative to a base address, and a second different part (e.g., and in an embodiment, one or more least significant bits) of the work item identifier indicates the relative position of the data element for the work item within the group of N data elements that the data element for the work item belongs to.

In other words, one part, e.g. the MSBs, of the work item identifier indicates where the group of data elements that the work item data element in question belongs to should be stored, with another part, e.g. the LSBs, of the work item identifier then indicating "where" in the group of data elements, the data element in question should be stored.

As will be discussed further below, the Applicants have recognised that storing data generated by graphics processing pipeline stages in this manner facilitates more simplified and straightforward sharing and use of such data as between pipeline stages, and in particular can provide an efficient and "common" memory addressing format that can be used for a plurality of pipeline stages (and for different data types), such that the mechanism for accessing the storage locations for the data elements can be the same as between different pipeline stages, thereby facilitating more efficient graphics processor operation and design (for example in terms of the functionality that is required for accessing data storage locations by different pipeline stages). Moreover the operation in the manner of the technology described herein is relatively low-effort both in hardware and software.

The arrangement of the technology described herein also provides a relatively simple mechanism for determining the memory addresses where data elements produced by stages of a graphics processing pipeline should be/are stored (as well as being able to be used in common between different pipeline stages). It can, for example, reduce the amount of data that is needed to determine the memory address for a data element, and correspondingly simplify the memory address determination. For example, in the technology described herein, the memory address for a data element (e.g. vertex attribute) can be determined without, for example, needing to know the actual size of the work item (e.g. vertex) packet that the data element belongs to.

The technology described herein correspondingly extends to the reading of data elements (for use) that have been stored in the manner of the above embodiments of the technology described herein.

Thus, a further embodiment of the technology described herein comprises a method of operating a graphics processor when executing a graphics processing pipeline to generate an output, the graphics processing pipeline being executed comprising a plurality of pipeline stages, the method comprising:

when a data element for a work item is needed for a pipeline stage that uses data elements for each of a plurality of work items being processed by the pipeline stage, which data elements have been stored as one or more work item packets, each work item packet configured for storing data elements for a plurality of work items, with the data elements in a work item packet being stored as one or more groups of N data elements in the work item packet:

using an identifier for the work item configured such that a first part of the work item identifier indicates an offset for the group of N data elements that the data element for the work item belongs to relative to a base address, and a second, different part of the work item identifier indicates the relative position of the data element for the work item within the group of N data elements that the data element for the work item belongs to, to determine a memory address from which to read the data element for the work item; and reading the data element for the work item from the determined memory address.

A further embodiment of the technology described herein comprises a graphics processor operable to execute a graphics processing pipeline comprising a plurality of pipeline stages to generate an output, the graphics processor comprising:

a processing circuit configured to, when a data element for a work item is needed for a pipeline stage that uses data elements for each of a plurality of work items being processed by the pipeline stage, which data elements have been stored as one or more work item packets, each work item packet configured for storing data elements for a plurality of work items, with the data elements in a work item packet being stored as one or more groups of N data elements in the work item packet:

use an identifier for the work item configured such that a first part of the work item identifier indicates an offset for the group of N data elements that the data element for the work item belongs to relative to a base address, and a second, different part of the work item identifier indicates the relative position of the data element for the work item within the group of N data elements that the data element for the work item belongs to, to determine a memory address from which to read the data element for the work item; and a processing circuit configured to read the data element for the work item from the determined memory address.

The technology described herein in these embodiments relates to the reading (accessing) of data for use by a processing stage of a graphics processing pipeline (e.g., and in an embodiment, that has been generated by a preceding stage of the graphics processing pipeline).

In this case, the memory address where a data element for a work item is stored is again determined using an identifier for the work item that the data element relates to, which identifier is configured such that a first part of the work item identifier indicates an offset for the group of N data elements that the data element for the work item belongs to relative to a base address, and a second, different part of the work item identifier indicates the relative position of the data element for the work item within the group of N data elements that the data element for the work item belongs to.

The data element for the work item is then read from the determined memory address (and will be, and is in an embodiment, then used appropriately by a pipeline stage for its processing (processed by the pipeline stage)).

The graphics processing pipeline stage for which the data elements are being stored/read in the manner of the technology described herein can be any suitable and desired pipeline stage either that generates a respective data element for each of a plurality of work items being processed by the pipeline stage, or that uses a respective data element for each of a plurality of work items being processed by the pipeline stage.

Thus it may comprise, for example, and in an embodiment, any of: a vertex shading stage, a geometry processing stage, a fragment processing (shading) stage, a compute shading stage, a mesh shading stage, a task shading stage, a tessellation shading stage, etc., In the case of generating and storing respective data elements for work items in the manner of the technology described herein, in an embodiment the pipeline stage is a vertex shading stage or a compute shading stage. In the case of using data elements for work items in the manner of the technology described herein, the pipeline stage is in an embodiment a fragment processing (shading) stage or a binning/tiling stage.

Subject to the required operation in the manner of the technology described herein, the pipeline stage can otherwise operate in any suitable and desired manner, such as, and in an embodiment, in the normal manner for the graphics processor and graphics processing pipeline in question.

Thus, in the case of generating data elements for work items (that are then stored in the manner of the technology described herein), the pipeline stage in question can, and in an embodiment does, generate the data elements themselves in the normal manner for that pipeline stage in the graphics processor and graphics processing system in question. Correspondingly, in the case of the pipeline stage using data elements for work items that are read in the manner of the technology described herein, that pipeline stage can and in an embodiment does then process and use those data elements in the normal manner for that pipeline stage in the graphics processor and graphics processing system in question.

In an embodiment, plural processing stages of the graphics processing pipeline that the graphics processor is executing are operable in and operate in the manner of the technology described herein (with respect to the handling of data elements for work items that they are processing). For example, and in an embodiment, one or more vertex shading stages, and a fragment shading stage, of the graphics processing pipeline may operate and be operable in the manner of the technology described herein.

In an embodiment, the pipeline stage or stages for which operation in the manner of the technology described herein is performed are pipeline stages that generate/use data elements for work items that each have the same, fixed (data) size (in terms of their number of bits/bytes). Correspondingly, the data elements that are stored/read in the manner of the technology described herein are in an embodiment data elements where all the data elements of the type in question have the same, fixed (data) size. This will typically be the case for, for example, vertex attributes (where, e.g., the positions for each vertex will all be the same data size), and for (appropriate) primitive attributes.

The work items for which the data elements are being stored/read will correspondingly be and can be any suitable and desired work items that processing stages of a graphics processing pipeline can perform processing in respect of. The work items should and in an embodiment do, accordingly correspond to the particular work items that the graphics processing stage in question generates/uses. Thus in one embodiment, the work items are vertices. In another embodiment, the work items are primitives.

The data elements that are being stored/used will be, and in an embodiment are, appropriate data elements for the work items in question. Thus they in an embodiment correspond to respective attributes that are generated/used for the work items in question. A given data element may correspond to a single attribute, or a plurality of attributes (where the attributes are stored together).

Thus in the case where the work items are vertices (whether being generated by a vertex shading stage or used by another stage, such as a fragment shading stage), the data element for each work item that is being stored/read in the manner of the technology described herein may comprise a position for each work item and/or a varying (non-position attribute) for each work item. In the case of varyings at least, the data element may comprise a plurality of varyings that are stored together.

Thus in one embodiment, the work items are vertices, and the data element for each vertex is a position for the vertex, or one or more varyings for the vertex.

In the case where the work items are primitives, then the data elements will be one or more primitive attributes for the primitives. Thus in another embodiment, the work items are primitives, and the data element for each work item (primitive) is one or more primitive attributes.

As discussed above, in an embodiment, each data element that is stored in a respective group of N data elements in a work item packet has the same (data) size. In an embodiment, the pipeline stage generates (and/or uses) a respective same-size data element for each of a plurality of work items being processed by the pipeline stage. Correspondingly, the data elements will be stored as respective groups of N same-sized (fixed size) data elements in the work item packet.

The operation and in particular the memory address determining mechanism of the technology described herein is particularly advantageous in the case where the data elements that are stored in groups of N data elements in the work item packet are each of the same, fixed (data) size.

The work item packets may comprise, for example, geometry packets, vertex packets, primitive (polygon) packets, etc., A work item packet may store data elements for one type of work item only, or for plural different types of work items (e.g., and in an embodiment, for both vertices and primitives).

A (each) work item packet should be, and is in an embodiment, configured to be able to store data elements for a plurality of work items, and in an embodiment does store data elements for a plurality of work items. (Although the Applicants recognise that there may be certain circumstances where a work item packet, even though having the capacity to store the data elements for a plurality of work items, may in fact only store a data element or elements for a single work item. This may arise, for example, where a draw call relates to a single primitive only, for example.)

In an embodiment, a (each) work item packet is configured for (and has capacity for) storing at least one group of N data elements (i.e. data elements for N work items). In an embodiment, the work item packets are configured for storing an integer number of groups of N data elements (which may be one, or more than one, group of N data elements).

A (each) work item (e.g. vertex) packet can store the data elements (e.g. vertex attributes) for any suitable and desired number of work items (e.g. vertices).

In an embodiment, each work item packet can store (and stores) (the data elements for) up to a particular, in an embodiment selected, in an embodiment predetermined, (maximum) number of work items (such that once that threshold number of work items is reached for a work item packet, (if necessary) a new work item packet will be created).

In an embodiment, the process is configured such that a work item packet contains the maximum number of work items (for the packet in question) where possible. However, it is not necessary for a work item packet to contain the maximum number of work items, and indeed an advantage of the technology described herein is that it facilitates the generation and handling of work item packets that contain fewer than the maximum number of work items in a more efficient manner.

In an embodiment, the maximum number of work items for a given work item packet can be set dynamically (in use). Thus a respective work item packet will have an intended (maximum) number of work items that it can/will store, but different work item packets may have different (maximum) numbers of work items. There may also be an overall maximum number of items that no packet may exceed. For example, in the case of vertex packets, there may be an overall maximum 256 vertices that a vertex packet may contain, but particular vertex packets may be configured and set to store fewer numbers of vertices, such as 32, 64 or 128 vertices. In an embodiment the (maximum) number of work items to be stored in a packet is an integer multiple of the number N of data elements in a data element group.

The data elements for the work items can be added to a work item packet (and a work item packet created) in any suitable and desired manner. For example, (the data elements for) work items may be progressively added to a work item packet, e.g. until a condition for finishing that work item packet (and, if necessary, starting a new work item packet), such as the (maximum) number of work items for the packet being met, is reached.

The data elements are stored in a work item packet as respective groups of N data elements (save potentially for a final group of data elements where there are insufficient remaining data elements to reach N).

The number of data elements (N) that are stored in a respective group in a work item packet can comprise any suitable and desired (plural and integer) number of data elements.

In an embodiment, the number of data elements in each group of N data elements is based on, and in an embodiment equal to, the number of work items that can be processed together as a respective thread group (warp) when executing a shader program on the graphics processor in question. Thus, in particular in the case where the graphics processor is configured to handle thread group (warp) sizes of 16 threads, the data elements are in an embodiment stored as respective groups of 16 data elements in a work item packet. Other arrangements would be possible. For example, each group of N data elements may comprise, for example, 8, 16 or 32 data elements.

Having fewer data elements per group may increase the likelihood of having to include "padding" in a work item packet, but having greater numbers of data elements in each group will affect the configuration of the work item identifiers that are used to determine the memory addresses for the data elements.

A work item packet may include a single group of N data elements, or plural groups of N data elements (e.g. up to the maximum number of work items that a work item packet is permitted to contain (as discussed above)). In an embodiment, a work item packet comprises plural groups of N data elements, but there can be some work item packets that only contain a single group of N data elements.

In an embodiment the size of each group of N data elements is the same, irrespective of the particular data element and work item (and work item packet) in question.

Thus, for example, and in an embodiment, each group of N data elements will comprise 16 data elements, whether the data elements relate to vertex attributes (and the work items are vertices) or relate to primitive attributes (with the work items then being primitives), etc.

A work item packet may store only the data elements in question. However, in an embodiment, a work item packet stores both the data elements in question and other data. The other data may comprise any suitable and desired data that is, e.g., and in an embodiment, generated, or required and used, by and/or for operation of a stage or stages of the graphics processing pipeline. Thus it may, and in an embodiment does, comprise one or more of, and in an embodiment both of: a header and metadata for the work item packet, such as a pointer to a descriptor for the draw call that the packet relates to.

The other data may be stored in a work item packet relative to the (groups of) data elements in any suitable and desired manner. In an embodiment, the other data for the work item packet is stored at the beginning of the packet, and then followed by the group(s) of N data elements storing the data elements themselves.

In an embodiment the work item packet also stores a set of identifiers for the work items for which the work item packet stores data elements. These work item identifiers need not be, and in an embodiment are not, the work item identifiers that are used to access the storage locations for the data elements in the manner of the technology described herein.

Thus, in an embodiment, a work item packet stores a set of identifiers for the work items for which the work item packet stores data elements, that are a different set of work item identifiers for the work items that the work item packet relates to to the work item identifiers that are used to access the storage locations for the data elements in the manner of the technology described herein.

Indeed, as will be discussed further below, an advantage of the technology described herein is that the work item identifiers that are used for determining the memory addresses for the data elements for the work items in the technology described herein need not be stored for later use when a work item packet is generated (whether in the work item packet itself or otherwise), and can be, and are in an embodiment, (simply) generated when there is a need to read the data elements from a work item packet.

In an embodiment, a set of work item identifiers that are stored/used in a work item packet comprise a set of work item identifiers that uniquely identify the work items in the work item packet itself (but in an embodiment do not otherwise convey any further information about the work items in the packet).

For example, and in an embodiment, the work item identifiers that are stored in a work item packet may comprise a contiguous sequence of indices (for and within the work item packet) for the work items that the packet stores data elements for (whereas the work item identifiers that are used for determining the memory addresses for the data elements for the work items in the technology described herein need not be, and typically will not be, and in an embodiment are not, a contiguous sequence of indices (for and within the work item packet) for the work items that the packet stores data elements for).

In an embodiment, a work item packet stores a set of identifiers for work items for which the work item packet stores data elements that identify the work elements with respect to the render output (e.g. draw call) being generated, and also uses and stores a set of work item identifiers that uniquely identify the work items in the work item packet itself (but not within the render output, e.g. draw call being generated).

Most in an embodiment, a work item packet stores a set of identifiers that identify work items (e.g. vertices and/or primitives) within the render output being generated, and a set of data that defines the primitives that the packet relates to using vertex identifiers that uniquely identify the vertices in the work item packet itself (but not in terms of the render output (e.g. draw call), being generated).

Where a work item packet stores work item identifiers, then again those work item identifiers may be stored in the work item packet relative to the (groups of) data elements in any suitable and desired manner, but in an embodiment are stored before the group(s) of any data elements storing the data elements themselves in the work item packet.

A work item packet may store only a single set of (groups of N) data elements, for example in dependence upon the data elements that the graphics processing pipeline stage in question generates. For example, in the case of (vertex) position shading, each work item packet may simply store respective (groups of) positions for the work items (vertices) that the (vertex) packet relates to.

Thus, in one embodiment, the work item packet stores one set of (groups of N) data elements.

However, it would also be possible for the given work item packet to store plural sets of (groups of N) data elements, if desired, and in other embodiments, this is the case. For example, in the case of vertex shading, a vertex packet could store a respective set of (groups of N) positions for the vertices that the packet relates to, and also store a set of (groups of N) other attributes (varyings) for the vertices that the vertex packet relates to.

In this case, the respective different sets of data elements are in an embodiment stored in the manner of the technology described herein (as respective groups of N data elements in the work item packet), but there will then be plural sets of such groups of N data elements in the work item packet.

The different sets of (groups of N) data elements stored in the work item packet in these arrangements can be stored in the work item packet as desired.

In an embodiment, the different sets of (groups of N) data elements are stored in an interleaved manner in a work item packet (rather than all the sets of (groups of N) data elements for a first data element "type" being stored together, and then being, e.g., followed by the set of (groups of N) data elements for another work item data element "type").

In an embodiment where there are plural different sets of groups of N data elements stored in a work item packet, the different sets of groups of N data elements are stored in the work item packet such that a group of N data elements from a first set of groups of N data elements will be stored in the work item packet, followed by a group of N data elements relating to the same work items for another of the sets of groups of N data elements that are stored in the work item packet, with the next group of N data elements for the first set of groups of N data elements then being stored next, followed by the group of N data elements from the second set of groups of N data elements for that group of work items, and so on.

Thus, for example, and in an embodiment, in the case where a work item packet stores both positions and varyings for vertices, there will be a first group of N data elements storing positions for a corresponding group of vertices, followed by a group of N data elements storing the varyings for that group of vertices, followed by a group of N data elements storing positions for a next group of N vertices, followed by a group of N data elements storing the varyings for that group of vertices, and so on.

In the case where there are plural sets of (groups of N) data elements in a work item packet (for a respective set of work items), then while it would be possible to use different identifiers for the work items for the different sets of (groups of N) data elements to determine the respective memory addresses, in an embodiment, the same identifier for a work item is usable and used to determine the memory address for plural, and in an embodiment for each, different set of (groups of N) data elements for the work item in question in a work item packet.

Thus, for example, and in an embodiment, where a vertex packet stores both positions and varyings for vertices, the same vertex identifier is in an embodiment usable and used to determine the memory address both for the position for the vertex in question and for the varyings for the vertex in question that are stored in the vertex packet.

In an embodiment, a work item packet may relate to more than one type of work item. For example, and in an embodiment, a work item packet may store both data elements (attributes) for vertices and data elements (attributes) for primitives.

In this case therefore there will be one or more sets of (groups of N) data elements stored in the work item packet storing data elements for a first work item type (e.g. vertices), and one or more sets of (groups of N) data elements stored in the work item packet for a different work item type (e.g. primitives).

In this case, the respective different sets of groups of N data elements for the different work item types can be stored in a work item packet in any suitable and desired manner. In an embodiment, all of the sets of groups of N data elements for one work item type are stored together, and separately to the groups of data elements for the other work item type (rather than, for example, the groups of data elements for the different work item types being interleaved within the work item packet).

Thus, for example, in the case where a work item packet stores both vertex attributes and primitive attributes, the groups of vertex attributes and the groups of primitive attributes are in an embodiment stored separately to each other in the work item packet, for example with all the groups of vertex attributes being stored together, followed by the groups of primitive attributes (or vice-versa).

In the case where a work item packet stores data elements for different work item types, then in an embodiment different, respective, sets of work item identifiers, for each different work item type, configured in the manner of the technology described herein, are used for accessing the respective work item type data elements (for determining the memory addresses for the respective work item type data elements). Thus, again, in the case where a work item packet stores both vertex attributes and primitive attributes, respective vertex identifiers will be used for determining the memory addresses for the vertex attributes, and respective primitive identifiers will be used for determining the memory addresses for the primitive attributes.

The work item identifiers that are used in the technology described herein to determine a memory address for a data element in a work item packet for a work item can be configured in any suitable and desired manner.

As discussed above, a first part of the work item identifier is used to indicate an offset for the group of N data elements that the data element for the work item belongs to relative to a base address, and a second, different part of the work item identifier indicates the relative position of the data element for the work item within the group of N data elements that the data element for the work item belongs to (in the work item packet in question).

The first and second parts of work item identifier can be configured and arranged as desired. For example, the first part may precede the second part in the identifier, or vice-versa, or they may be interleaved in the identifier.

The first and second parts of the work item identifier each in an embodiment comprise respective (and different) sets of one or more bits of the work item identifier.

Most in an embodiment the first part of the work item identifier that indicates an offset for the group of N data elements that the data element for the work item belongs to relative to a base address comprises a set of one or more most significant bits of the work item identifier.

Correspondingly, the second, different part of the work item identifier that indicates the relative position of the data element for the work item within the group of N data elements that the data element for the work item belongs to in an embodiment comprises a set of one or more least significant bits of the work item identifier.

The second part (e.g. the set of one or more least significant bits) of a (and each) work item identifier can indicate the relative position of the data element within its respective group of N data elements in any suitable and desired manner. In an embodiment, it simply acts as, and is in the form of, an index for the data element within its respective group of N data elements. Thus, where, for example, the data elements are stored as respective groups of 16 data elements, each data element within a group of 16 data elements will have a corresponding index from 0 to 15 depending upon its relative position within the group of 16 data elements.

The second part (e.g. the set of one or more least significant bits) of a (and each) work item identifier that is used to indicate the relative position of the data element within its respective group of N data elements should (at least, and in an embodiment only) comprise the necessary number of bits to be able to (uniquely) indicate (identify) N different data elements (as there are N data elements in a group).

Thus where, for example, each group of N data elements comprises 16 data elements, four (in an embodiment least significant) bits of a (and each) work item identifier are in an embodiment used to indicate the relative position of the data element for the work item in question. (Correspondingly, if each group of data elements comprises only 8 data elements, three (least significant) bits will (in an embodiment) be used for this purpose, and so on.)

The first part of the work item identifiers that indicate an offset for the group of N data elements that the data element for the work item belongs to relative to a base address can indicate that offset in any suitable and desired manner. In an embodiment, they indicate an offset to the start (address) of the group of N data elements in the work item packet relative to the base address.

Most in an embodiment, the first part of a (and each) work item identifier indicates the offset relative to the base address in terms of an (integer) number of cache lines (for the (graphics processor and graphics processing system in question). Thus, in an embodiment, the first part of a (and each) work item identifier indicates a cache line offset from a base address to (in an embodiment the beginning (start) of) the group of data elements in question.

To facilitate this operation, each group of N data elements is in an embodiment stored at a contiguous set of memory addresses, starting at a memory address that is aligned with the beginning of a cache line (for the graphics processing system in question). Accordingly, in an embodiment, a (and each) group of N data elements that is stored in a work item packet is stored starting at a memory address that is aligned with the beginning of a cache line.

Where each group of N data elements exactly fills an integer number of cache lines, then the respective groups of N data elements (where there is more than one in a work item packet) can (simply) be stored one after another for a contiguous sequence of memory addresses, as in that case each group will inevitably start at the beginning of a cache line.

In the case where a group of data elements does not completely fill an integer number of cache lines, then rather than starting the next group of N data elements (if any) at the memory address immediately following the end of the previous group of data elements, in an embodiment the next group of data elements is stored starting at the beginning of a (and in an embodiment the next) cache line, with any remaining (unused) space at the end of a cache line that is storing the data elements for the previous group not being used (which unused space can be appropriately "padded", if desired).

Any suitable and desired number of (most significant) bits may be used for the first part of a work item identifier that is used to indicate the location (and in an embodiment the cache line offset, as discussed above) of (the start of) a group of data elements relative to the base address. As will be appreciated by those skilled in the art, the number of (most significant) bits that are available for this purpose will determine the range of (cache line) offsets that can be indicated from the same base address with the work group identifiers (without needing to change the base address).

In an embodiment, the overall size of the work group identifiers is set based on the range of (cache line) offsets from a base address that it may be desired to indicate for work item packets. As will be discussed further below, the bigger the range of (cache line) offsets that can be indicated using the work group identifiers, the more work item packets can share (use) the same base address, thereby avoiding the need to configure a new base address.

The work item identifiers can have any suitable and desired (data) size, such as being 16, 32 or 64 bits in size. In an embodiment, they are each 32 bits in size. Thus in the case where there are 16 data elements in each group of data elements, in an embodiment the 28 most significant bits of each work group identifier will be used for indicating the (cache line) offset for the group of data elements from a base address.

In an embodiment, the same (data) size and configuration is used for the work item identifiers for all work item packets and pipeline stages that use and handle work item packets in the manner of the technology described herein (i.e. irrespective of the type of work item, data element, and work item packet). Thus, for example, in an embodiment, each work item identifier that is used in the technology described herein will be 32 bits in size, with the 28 most significant bits of each work group identifier being used as the first part of the work group identifier, and the 4 least significant bits of the work group identifier being used as the second part of the work item identifier.

Other arrangements would, of course, be possible.

The base address that (the first part of) a work item identifier indicates the location of the group of data elements in question relative to can be any suitable and desired base address for this purpose. (As will be discussed further below, the work item identifiers are in an embodiment appropriately generated based on a base address that is set in use, and so any suitable base address can be used for this purpose.)

A different base address could be used for each work item packet (with the work item identifiers then being configured accordingly for the packet in question) (and in one embodiment this is the case).

However, in an embodiment, the same base address can be, and is in an embodiment, used for plural work item packets. In this case, the same base address is in an embodiment used for plural work item packets for the same pipeline stage. Thus, in an embodiment when a given pipeline stage is performing processing for/using plural work item packets, in an embodiment the same base address is used for plural of those packets for the pipeline stage in question (but different pipeline stages, even if using the same work item packets, may use different base addresses).

The Applicants have recognised in this regard that if the work item identifiers are configured such that the first parts of those identifiers can indicate an appropriately large range of offsets relative to a base address, then the same base address can be used for plural work item packets (simply by setting the work item identifiers appropriately for the different work item packets), such that the same base address can (potentially) be used for multiple work item packets.

Indeed, it is a particular advantage of the technology described herein that the same base address can (potentially) be used for multiple work item packets, as that then avoids the need to change the base address whenever a new work item packet is to be accessed. For example, the Applicants have recognised that changing the base address that is used may require more substantial, e.g. context, changes in the operation of the graphics processing pipeline, and so reducing the need to change the base address when accessing work item packets can correspondingly reduce the need for such (relatively expensive) context changes, for example.

Thus, in an embodiment, the same base address is used when determining the memory addresses for data elements for plural different work item packets.

Correspondingly, in an embodiment a base address that has been generated with reference to one work item packet is in an embodiment also used for one or more other work item packets.

For example, in an embodiment, when a pipeline stage is to process a plurality of work item packets, in an embodiment a base address is determined for the first work item packet to be processed, but with that same base address then being used for one or more subsequent work item packets (in an embodiment unless and until the (e.g. start) memory address for a work item packet means that the memory addresses in that work item packet cannot be appropriately indicated using the work item identifier size being used (e.g. because they are outside the range of memory addresses (from the base address) that can be indicated using the work item identifiers)).

The base address that is used for a work item packet (or packets) is in an embodiment based on (and set based on) a memory address for a work item packet (e.g. for the work item packet in question) (a memory address at which (data for) the work item packet should be/is stored), such as, and in an embodiment, the start memory address at which the work item packet in question should be/is stored.

In an embodiment, the base address for a work item packet that is used in the technology described herein is based on, but need not be equal to (and in some embodiments is not equal to), the memory address for the start of the work item packet.

Thus, the base address may correspond to a memory address at which the work item packet in question is/should be stored (e.g. starts at) (and in some embodiments that is the case), but that need not be the case, and it can be (and in other embodiments is) different to a (e.g. start) memory address for the work item packet in question.

In an embodiment, the base address that is used is a memory address that is a certain, e.g. selected, e.g. predetermined, offset ahead of a (e.g. the start) address for a work item packet (that the base address is being set for). For example, the base address may be set to be a particular data size (e.g. 2 MB) in front of the memory address for the start of the work item packet itself. This will then help to facilitate using the same base address for multiple work item packets, as it will leave some "address space" before the work item packet that may be used for other work item packets.

The memory address for (e.g. the start of) a work item packet (that the base address for accessing the work item packet may then be determined based on) in this regard can be determined and set in any suitable and desired manner. For example, and in an embodiment, in the case of storing work item packets in the manner of the technology described herein, there may first be, and is in an embodiment, a request made for a memory allocation for storing the work item packet or packets in question. In this case, once the memory allocation has been made, then the, e.g. start of, that memory allocation for storing the work item packet or packets can then be, and is in an embodiment, used as the base address for storing the data elements in the work item packets in the manner of the technology described herein.

Thus, in an embodiment, the method of the technology described herein comprises (and the graphics processor is (comprises processing circuits) configured to), when generating data elements to be stored as one or more work item packets, requesting a memory allocation (from a memory system of or associated with the graphics processor) for storing the work item packet or packets, and determining a base address to be used for storing data elements for work items in the work item packet or packets in the manner of the technology described herein based on, and following, the memory allocation.

In the case of reading data elements from a work item packet that has already been stored, then the memory address for the work item packet that the base address to be used for accessing the data elements in the work item packet is determined based on should be, and is in an embodiment, a memory address where the work item packet is stored, such as, and in an embodiment, the start memory address for the work item packet in question. The (start) memory address for a work item packet can be provided to the base address determination process in this regard in any suitable and desired manner, for example in the form of a pointer or other (meta) data that indicates where the packet is stored.

In the case where a work item packet stores multiple different sets of groups of data elements for work items (e.g. stores both groups of vertex positions and groups of vertex varyings for vertices), then the same base address could be used for plural (e.g. all) of the different sets of groups of data elements.

However, in an embodiment, a different base address is used for different (and in an embodiment for each different) sets of groups of data elements in a work item packet. For example, a first base address may be used for accessing vertex positions in a vertex packet, with a second, different base address being used for accessing vertex varyings in that same work item packet.

In this case, the same work item identifier is in an embodiment used for a work item when accessing the different types of data element for that work item, with the different base addresses for the different sets of groups of data elements accordingly allowing (and being configured to allow) the same work item identifier to be used for a work item to access the data elements for that work item in the different sets of groups of data elements appropriately.

Thus, for example, in the case of a vertex packet that stores both vertex positions and vertex varyings, the same vertex identifier is in an embodiment used to access both the position and varyings for that vertex, but there will be a different base address used when accessing the positions to when accessing the varyings.

In this case, in an embodiment a first base address to be used for accessing one set of groups of data elements in the work item packet is determined, e.g. and in an embodiment based on a memory address (e.g. the start address) for the work item packet in question, with the base address for another (the other) set of groups of data elements then being derived from and based on that first base address.

Thus, in an embodiment, the base address for one set of groups of data elements (e.g. vertex varyings) is based on, and in an embodiment derived from, the base address that is used for another (the other) set of groups of data elements (e.g. vertex positions).

The second base address that is used for another set of groups of data elements in this regard may be based on the first base address that is used for the first set of groups of data elements in any suitable and desired manner. In an embodiment it is set at a particular, in an embodiment selected, in an embodiment predetermined, offset from the first base address, which offset is in an embodiment based on the size of a group of data elements in the first set of groups of data elements that the first base address is to be used for.

For example, in the case where there are both vertex positions and vertex varyings stored in a vertex packet, a first base address may be determined for the accessing the vertex positions, with a second base address for accessing the vertex varyings then being determined from the first base address based on the size of a group of vertex positions (which may, e.g., be 256 KB). This will then have the effect that where a group of positions is followed by a group of varyings (and then followed by another group of positions followed by another group of varyings, and so on), the base address used for the varyings will have the effect of offsetting the start of the memory addresses for the varyings by (the size of) one group of positions, such that the same vertex identifier (together with the appropriate, respective base address) will be able to be used to both access the position and the varyings in the vertex packet for the vertex in question.

In the case where a work item packet stores sets of groups of data elements for different types of work items (e.g. stores both groups of vertex attributes for vertices and groups of primitive attributes for primitives), then again the same base address could be used for plural (e.g. all) of the groups of data elements for the different work item types.

However, in an embodiment, a different base address is used for different (in an embodiment for each different) type of work item for which groups of data elements are stored in a work item packet. For example, and in an embodiment, a first base address may be used for accessing vertex attributes, with a second, different base address being used for accessing primitive attributes in the same work item packet. In this case, different work item identifiers should be, and are in an embodiment, used for the different types of work item (i.e. vertex identifiers will be used to access vertex attributes, and primitive identifiers will be used to access primitive attributes).

In this arrangement, again the base address to be used for accessing data elements for one type of work item is in an embodiment based on a base address that is used for accessing the data elements for another type of work item, and most in an embodiment set, as discussed above, as being at a particular, in an embodiment selected, in an embodiment predetermined offset from that base address.

As discussed above, in the technology described herein, the memory address at which to store/read a data element for a work item is determined based on a corresponding work item identifier for which a first part (e.g. the MSBs) indicates an offset for the group of N data elements that the data element for the work item belongs to relative to a base address, and a second, different part (e.g. the LSBs) of the work item identifier indicates the relative position of the data element for the work item within the group of N data elements that the data element for the work item belongs to.

Thus, once a base address for accessing a work item packet has been determined, that base address can then be used together with the corresponding work item identifier, to determine the memory address for a data element for the work item in question in the work item packet in question. This process can be performed in any suitable and desired manner.

In an embodiment, to determine the memory address for a data element for a work item, the first part of the work item identifier is used to determine an offset (e.g., and in an embodiment, in terms of a number of cache lines) from the base address, with that offset then correspondingly being added to the determined base address, to thereby give, in effect, the memory address for (the start of) the group of N data elements that the data element for the work item belongs to.

A memory address "offset" for the data element itself within the group of N data elements is in an embodiment determined by multiplying the relative position of the data element for the work item within the group of N data elements that the data element for the work item belongs to indicated by the second part of the work item identifier for the data element, by the size (stride) for each data element in the group.

This data element "group" address offset can then be combined with the determined memory address for the group of data elements, to give the (start) memory address for the data element in question.

Thus, in an embodiment, the memory address for a data element is determined as:

memory address for data element = base address + offset indicated by first part of work item identifier + (second part of work item identifier * stride)

where the stride is the (data) size of a data element in the group of data elements in question, and the second part of the work item identifier for the work item is effectively an index for the work item within the group of N data elements in question.

Thus, in embodiments at least, the first part, e.g. most significant bits, of a work item identifier is used to determine an (integer) cache line offset from a base address for the start of the group of N data elements in question (which will be aligned to the beginning of a cache line), with the, second part, e.g. least significant bits, of the work item identifier that indicate the relative position of the data element in question within the group of N data elements then being used to determine the memory address at start of the stored data element relative to that cache line using, for example, and in an embodiment, a known size (stride) for each data element in the group.

In order to facilitate this operation, each data element in a group of N data elements in an embodiment occupies the same (data) size (range of memory addresses).

It will be appreciated from the above that in order to be able to determine the memory address for a data element in a work item packet for a work item, it will be necessary to use work item identifiers that are appropriately configured for the base address that is being used for the memory address determination.

Thus, in an embodiment, the method of the technology described herein comprises (and the graphics processor correspondingly comprises a processing circuit or circuits configured to), once a base address for determining the memory address for a work item packet or packets has been determined, then determining work item identifiers in the form of the technology described herein based on and using that determined base address (and then using the so-determined work item identifiers to determine the memory addresses for the data elements for the work items in the work item packet or packets, accordingly).

In this case, when generating data elements for work items, the work item identifiers for the work items in a work packet are in an embodiment generated from the base address based on a determined offset for the group of N data elements that the data element for a work item belongs to relative to that base address, and then the relative position of the data element for the work item within the group of N data elements that the data element for the work item belongs to.

The offset relative to the base address for this purpose (that will form the first part of a work item identifier) may be determined, for example, and in an embodiment, from knowing the start address for the work item packet in question relative to the base address (which may, in an embodiment, be the same), and the size of any, e.g. metadata, to be stored in the work item packet, and the relative position of the group of N data elements in question relative to other groups of N data elements in the work item packet (and, e.g., the known size of a group of N data elements in the work item packet).

In the case of reading data elements for work items from a work item packet, the work item identifiers to use for that process are in an embodiment determined based on the determined base address for the work item packet, and a set of indices for the work items for which data elements are stored in the work item packet. The indices are in an embodiment indices that can correspondingly be, and are in an embodiment, used to determine the relative position of a data element for a given work item within the packet, in terms of which group of N data elements for the work item packet the data element belongs to, and the relative position of the data element for the work item within that group of N data elements. The indices accordingly in an embodiment comprise a set of indices that index the work items in the work item packet in a (contiguous) sequence, and are in an embodiment a set of (packet) local indices for the work items in the packet (and that are in an embodiment stored in the work item packet), as discussed above.

The base address and work item identifiers may be determined by the same processing stage of the graphics processing pipeline as will use (process) the data elements for the work items in question (and in one embodiment that is the case).

However, it would also be possible to determine the base address and/or work item identifiers to be used for determining the memory addresses for data elements for work items in work item packets at a different (e.g. earlier) stage/process of the graphics processing pipeline if desired, with that information then being conveyed appropriately to a later stage of the graphics processing pipeline that will then use the base address and the determined work item identifiers to access the data elements for the work items (to then use in its processing, for example (and in another embodiment this is what is done)).

For example, there may be an initial stage that determines a base address and vertex identifiers to be used for reading vertex attributes when performing fragment shading that is performed in advance of any fragment shading stage, with the appropriate base address and determined vertex identifiers then being provided to the fragment shading stage for the fragment shading stage to then use when performing fragment shading (and in particular to access shaded vertex attributes for vertices when performing fragment shading).

For example, a set of work item identifiers in the manner of the technology described herein could be determined and then added to (stored in) a work item packet, such that a later processing stage of the graphics processing pipeline that accesses and uses that work item packet can then use the work item identifiers stored in the packet to determine the memory addresses for the data elements for the work items in the work item packet.

For example, primitives that are initially "defined" using packet-local vertex indices prior to fragment shading, could then be defined using vertex identifiers in the manner of the technology described herein when being provided to the fragment shading stage, such that those vertex identifiers can then be used directly by the fragment shading stage to determine the memory addresses for, and read the relevant vertex attributes for, the vertices for the primitives.

Once the base address and work item identifiers have been determined, they can then be used as appropriate to determine and access the memory addresses for the work item data elements in question.

The operation of determining the memory addresses and then accessing those memory addresses for data elements for work items in the manner of the technology described herein can be performed in any suitable and desired manner.

In an embodiment, the graphics processor and graphics processing system uses one or more hardware controlled buffers for this purpose.

In this case, a (or the) hardware controlled buffer is in an embodiment configured with the appropriate base address that is to be used for accessing data elements in a work item packet, together with a data size (stride) for the data elements in question, and is configured to take as an input a work item identifier for a work item, and then determine the memory address for the data element for that work item from the work item identifier, base address and stride (as discussed above). In this case, the hardware control buffer or buffers may be, and are in an embodiment, reconfigured, each time there is a change in base address or stride for the data elements being accessed in the hardware controlled buffer.

In an embodiment, the graphics processor uses and comprises plural (and in an embodiment two, and in an embodiment only two) hardware control buffers for this purpose, with each hardware control buffer, where appropriate, being set to use a different base address and data element size (stride).

This will then allow, for example, where a work item packet stores two (or more) sets of groups of N data elements (e.g. both vertex positions and vertex varyings), one hardware controlled buffer to be configured to access the first set of groups of data elements (e.g. the vertex positions), with the second hardware controlled buffer then being configured to access another (the other) set of groups of data elements (e.g. the vertex varyings) (and in an embodiment, this is the case). In this case therefore, the same work item (e.g. vertex) identifier could be provided as an input to each hardware controlled buffer, but each hardware controlled buffer will then act to determine and access the memory address for the respective different type of data element for that work item (e.g. vertex).

Other arrangements would, of course, be possible.

It will be appreciated from the above, that in operation of the technology described herein, the base address, work item identifier, and/or memory address determining operations may require various types of information regarding the work item packets, such as relating to their content (e.g. in terms of any header or metadata stored in the work item packets, whether different sets of groups of data elements are stored in a work item packet, and/or whether groups of data elements for different work item types are stored in a work item packet, etc.); and/or information regarding the size of any data, such as of data elements or data element groups, and/or other data that is stored in a work item packet; and/or a memory address for a work item packet, etc.

This information may be provided to and conveyed to the appropriate process in any suitable and desired manner. For example, and in an embodiment, work item packets may be associated with appropriate metadata (e.g. descriptors) that can be used to, and in an embodiment do, indicate this information, where appropriate (and required).

Other arrangements would, of course, be possible.

For example, to facilitate the determination of a base address using a memory address (e.g. the start memory address) where a work item packet is stored, the work item packet (e.g., and in an embodiment, start) memory address is in an embodiment appropriately available to (e.g. provided to) the base address determining operation. The work item packet (start) memory address may be provided in any suitable and desired manner. In an embodiment, a pointer to the (start) memory address for a work item packet is provided and used for this purpose. This may be provided as (part of) appropriate metadata for the work item packet, such as (part of) a descriptor for the work item packet in question.

The data element size (stride) may be a known, e.g. predetermined, parameter of the process in question (e.g. all vertex positions may have the same size in the graphics processor and graphics processing system in question), and/or that information may be appropriately conveyed to the, e.g., memory address determining operation, for example by being part of appropriate metadata, such as a descriptor, for the work item attributes/packets in question. For example, the vertex varying size (stride) may be indicated as part of a packet descriptor.

As discussed above, in embodiments of the technology described herein, work item packets may contain plural different sets of groups of N data elements for a given type of work item, and/or groups of N data elements for different work item types (e.g. for both vertices and primitives). This may correspondingly lead to a need to determine plural different base addresses for accessing data elements for a work item packet, and/or plural different sets of work item identifiers for accessing data elements in a work item packet.

Accordingly, in an embodiment, a (and in an embodiment each) work item packet is associated with (has associated) information (metadata) indicating whether it contains plural (e.g. an additional set or sets of) groups of N data elements, and/or a set or sets of groups of N data elements for more than one work item type. For example, certain data elements (e.g. attributes) for work items may be able to be optionally generated, with a corresponding flag being set when those data elements (attributes) have been generated and stored in a work item packet.

Correspondingly, in the case where data elements can optionally be generated for a work item type (e.g. primitive attributes for primitives), again an appropriate indication, such as a flag, can be used to indicate whether a work item packet includes data elements for the "optional" work item type (e.g. contains primitive attributes for primitives) or not.

In an embodiment, an indication can also be, and in an embodiment is also, provided indicating an offset for (the start of) different respective groups of data elements in a work item packet, again, and in an embodiment, as part of metadata, such as a descriptor, associated with the work item packet. For example, in the case of a vertex packet, an offset to the start of the (groups of) vertex positions in the packet and/or an offset to the start of the (groups of) vertex varyings in the packet (where present) may be, and is in an embodiment, provided.

The above describes the main elements and operation of the graphics processor and graphics processing pipeline that are relevant to operation in the manner of the technology described herein.

As will be appreciated by those skilled in the art, the graphics processor can otherwise include and execute, and in an embodiment does include and execute, any one or one or more, and in an embodiment all, of the processing stages and circuits that graphics processors and graphics processing pipelines may (normally) include.

Thus, for example, the graphics processor may execute a graphics processing pipeline that includes one or more geometry processing stages, such as vertex shading, task shading, mesh shading, tessellation shading, etc., and execute one or more rendering stages, such as rasterisation and fragment shading stages, and/or appropriate ray tracing stages. In an embodiment the graphics processor is in the form of a tile-based graphics processor and so also includes and executes an appropriate tiling/binning stage or stages.

Correspondingly, the graphics processor may include any one or more of, and in an embodiment plural of: one or more geometry processing circuits, primitive assembly circuit or circuits, a tiling/binning circuit or circuits, a primitive setup circuit, a rasteriser circuit and a renderer circuit (in an embodiment in the form of or including a programmable fragment shader), a depth (or depth and stencil) tester, a blender, a tile buffer, a write out circuit, etc.

In an embodiment, the graphics processor comprises, and/or is in communication with a memory system, one or more memories, and/or memory devices that store the data described herein, and/or that store software for performing the processes described herein. The graphics processor may also be in communication with a host microprocessor, and/or with a display for displaying images based on the output of the graphics processor.

The output to be generated may comprise any output that can and is to be generated by the graphics processor and processing pipeline. Thus it may comprise, for example, a tile to be generated in a tile based graphics processing system, and/or a frame of output fragment data. The technology described herein can be used for all forms of output that a graphics processor and processing pipeline may be used to generate, such as frames for display, render-to-texture outputs, etc., In an embodiment, the output is an output frame, and in an embodiment an image.

In an embodiment, the various functions of the technology described herein are carried out on a single graphics processing platform that generates and outputs the (rendered) data that is, e.g., written to a frame buffer for a display device.

The various functions of the technology described herein can be carried out in any desired and suitable manner. For example, unless otherwise indicated, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, unless otherwise indicated, any one or more or all of the processing stages of the technology described herein may be embodied as processing stage circuits, e.g., in the form of one or more fixed-function units (hardware) (processing circuits), and/or in the form of programmable processing circuits that can be programmed to perform the desired operation. Equally, any one or more of the processing stages and processing stage circuitry of the technology described herein may be provided as a separate circuit element to any one or more of the other processing stages or processing stage circuits, and/or any one or more or all of the processing stages and processing stage circuits may be at least partially formed of shared processing circuits.

Subject to any hardware necessary to carry out the specific functions discussed above, the graphics processor can otherwise include any one or more or all of the usual functional units, etc., that graphics processors include.

It will also be appreciated by those skilled in the art that all of the described embodiments of the technology described herein can, and, in an embodiment, do, include, as appropriate, any one or more or all of the features described herein.

The methods in accordance with the technology described herein may be implemented at least partially using software e.g. computer programs. It will thus be seen that the technology described herein may provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, in a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

Embodiments of the technology described herein will now be described.

FIG. 1 shows an exemplary system on chip (SoC) graphics processing system 8 that comprises a host processor comprising a central processing unit (CPU) 1, a graphics processor (GPU) 2, a display processor 3, and a memory controller 5. As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 9 such as a game, executing on one or more host processors (CPUs) 1 will, for example, require the display of frames on the display panel 7. To do this, the application will submit appropriate commands and data to a driver 10 for the graphics processor 2, e.g. that is executing on a CPU 1. The driver 10 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

In the present embodiment, the graphics processor 2 executes a graphics processing pipeline that processes graphics primitives, such as triangles, when generating an output, such as an image for display.

Figure 2:
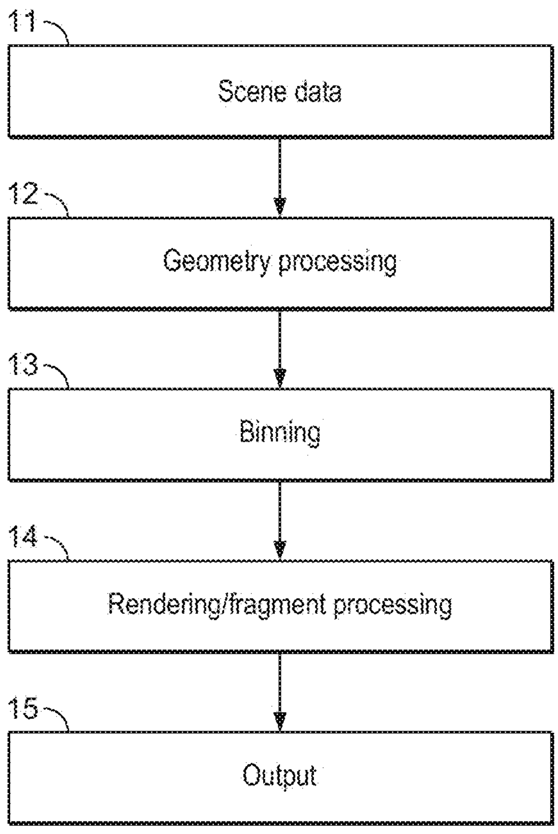
FIG. 2 shows an exemplary graphics processing pipeline.

FIG. 2 shows schematically the processing sequence of the graphics processing pipeline executed by the graphics processor 2 when generating an output in the present embodiments.

FIG. 2 shows the main elements and pipeline stages. As will be appreciated by those skilled in the art there may be other elements of the graphics processor and processing pipeline that are not illustrated in FIG. 2. It should also be noted here that FIG. 2 is only schematic, and that, for example, in practice the shown pipeline stages may share significant hardware circuits, even though they are shown schematically as separate stages in FIG. 2. It will also be appreciated that each of the stages, elements and units, etc., of the processing pipeline as shown in FIG. 2 may, unless otherwise indicated, be implemented as desired and will accordingly comprise, e.g., appropriate circuitry, circuits and/or processing logic, etc., for performing the necessary operation and functions.

As shown in FIG. 2, for an output to be generated, a set of, e.g. scene data 11, including, for example, and inter alia, a set of vertices (with each vertex having one or more attributes, such as positions, colours, etc., associated with it), a set of indices referencing the vertices in the set of vertices, and primitive configuration information indicating how the vertex indices are to be assembled into primitives for processing when generating the output, is provided to the graphics processor, for example, and in an embodiment, by storing it in the memory 6 from where it can then be read by the graphics processor 2.

This scene data may be provided by the application (and/or the driver in response to commands from the application) that requires the output to be generated, and may, for example, comprise the complete set of vertices, indices, etc., for the output in question, or, e.g., respective different sets of vertices, sets of indices, etc., e.g. for respective draw calls to be processed for the output in question. Other arrangements would, of course, be possible.

There is then a geometry processing stage or stages 12, which performs appropriate geometry processing of and for the scene data to generate the data that will then be required for rendering the output. This geometry processing 12 can comprise any suitable and desired geometry processing that may be performed as part of a graphics processing pipeline.

In the present embodiments, this geometry processing comprises at least performing vertex processing (vertex shading) of attributes for vertices to be used for primitives for the render output being generated. In particular, appropriate vertex position shading is performed to transform the positions for the vertices from the, e.g. "model" space in which they are initially defined, to the, e.g., "screen", space that the output is being generated in. In embodiments, the vertex shading also comprises generating and/or processing other, non-position attributes of vertices (varyings/varying shading). It would also be possible for some or all the varying shading to be deferred from the geometry processing and, for example, to be triggered at the binning or rendering stages instead, if desired.

As well as appropriate vertex shading, the geometry processing may comprise any other form of geometry processing that is desired, such as one or more of tessellation shading, transform feedback shading, mesh shading, or task shading. This geometry shading may also generate and/or process attributes for vertices, and/or it may process and generate attributes for primitives as well.

Once the desired geometry processing has been performed, there is then, in the present embodiments, as shown in FIG. 2, a binning/tiling stage 13. (It is assumed in this regard that the graphics processor 2 in the present embodiments is a tile-based graphics processor and so generates respective output tiles of an overall output (e.g. frame) to be generated separately to each other, with the set of tiles for the overall output then being appropriately combined to provide the final, overall output.)

The binning process operates to generate appropriate data structures for determining which primitives need to be processed for respective rendering tiles of the output being generated. For example, it may sort the primitives into appropriate primitive lists, which indicate the primitives to be processed for respective tiles or sets of tiles. Alternatively, it may generate other data structures, such as hierarchies of bounding boxes, that can then be used at the rendering/fragment processing stage to identify those primitives that need to be processed for a respective tile.

The binning/tiling process 13 may also cull primitives that are not visible (e.g. that fall outside the view frustum, and/or based on the facing direction of the primitives).

As part of the geometry processing and/or the binning/tiling operation the primitives to be processed will be "assembled". The primitives will, as discussed above, be assembled from a set of indices referencing vertices in a set of vertices for the render output processing being performed, based on primitive configuration information indicating how the vertex indices are to be assembled into primitives for processing when generating the render output.

Such primitive assembly may be performed as part of and at an appropriate stage of the geometry processing and/or as part of the binning/tiling processing, as desired. There may also, if desired, be two (or more) "primitive assembly" operations. For example, an initial primitive assembly operation could be performed to identify those vertices that will actually be used for the render output being generated before performing any vertex shading of the vertices, but with there then being a later primitive assembly stage that provides a sequence of assembled primitives for the binning/tiling stage.

Once the binning/tiling process has generated the necessary data structures for identifying the primitives to be processed for respective tiles of the render output, the primitives can then be and are then subjected to appropriate rendering/fragment processing 14. This operation is performed in the present embodiments on a tile-by-tile basis, using the data structures generated by the tiling/binning process 13 to identify those primitives that need to be processed for a respective tile.

The rendering/fragment processing can comprise any suitable and desired rendering and fragment processing operations that may be performed. Thus it may comprise, for example, first rasterising primitives to be processed for a tile to fragments, and then processing those fragments accordingly (e.g., and in an embodiment, by performing appropriate fragment shading of the fragments). The rendering/fragment processing may also or instead comprise performing ray tracing operations, such as performing the rendering by tracing rays for respective fragments representing respective sets of one or more sampling positions of the output being generated. Hybrid ray tracing operations would also be possible, if desired.

The output of the rendering/fragment processing (the rendered fragments) is written to a tile buffer (not shown). Once the processing for the tile in question has been completed, then the tile will be written to an output data array in memory 6, and the next tile processed, and so on, until the complete output data array 15 has been generated. The process will then move on to the next output data array (e.g. frame), and so on.

Figure 3:
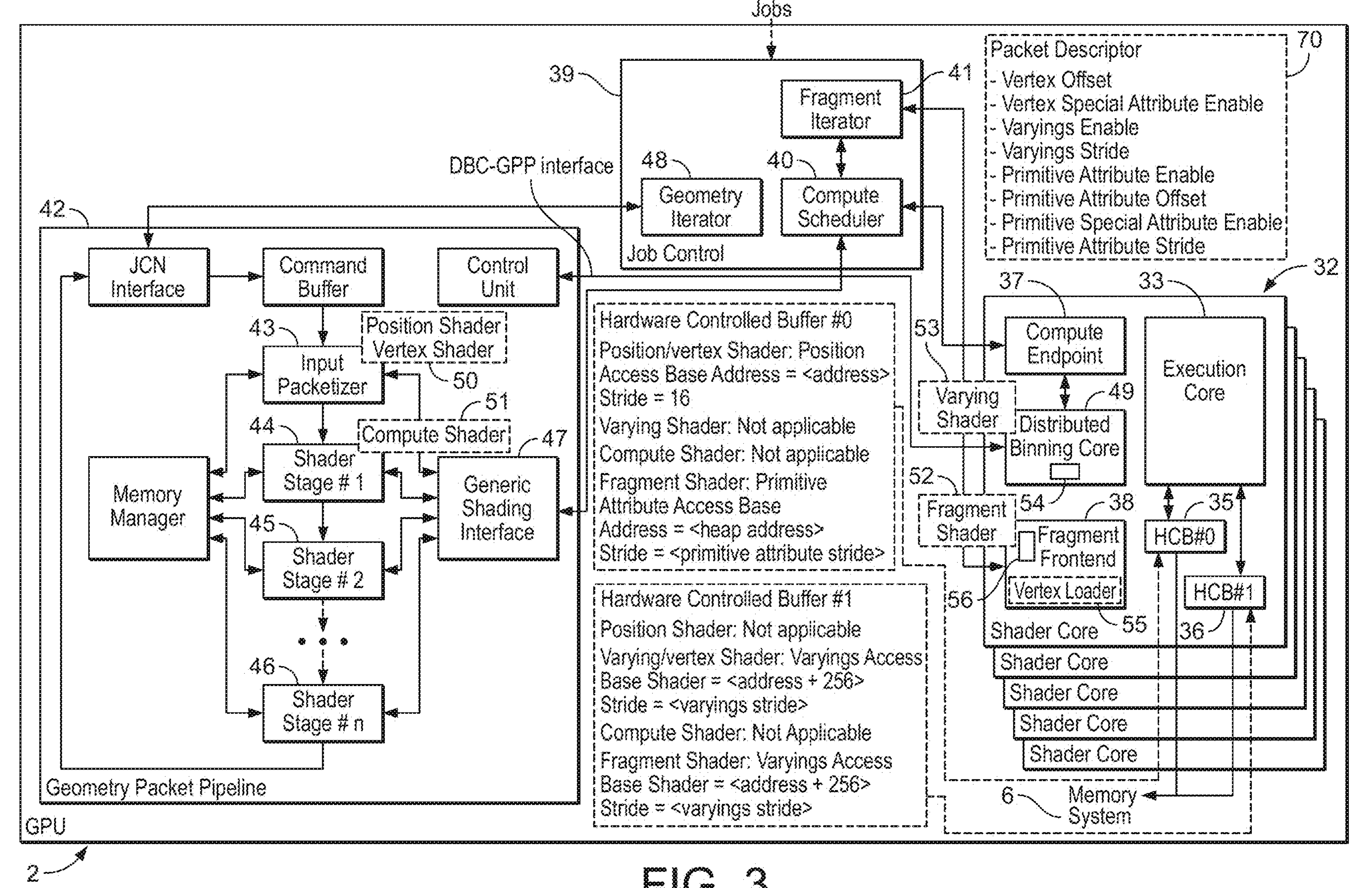
FIG. 3 shows schematically a graphics processor that may be operated in accordance with the technology described herein.

The output data array may typically be an image for a frame intended for display on a display device, such as a screen or printer, but may also, for example, comprise intermediate render data intended for use in later rendering passes (also known as a "render to texture" output), or for deferred rendering, or for hybrid ray tracing, etc., FIG. 3 shows an embodiment of a graphics processor (GPU) 2 that can execute a graphics processing pipeline of the form shown in FIG. 2, and that can be operated in the manner of the technology described herein.

As shown in FIG. 3, the graphics processor 2 comprises a plurality of processing (shader) cores 32 which are each operable to execute (shader) programs to perform processing operations. As shown in FIG. 3 each shader core 32 to facilitate this comprises a programmable execution unit (execution core) 33 that is operable to execute program instructions to perform processing operations.

Each execution core 33 has appropriate access to a memory system 6 of the data processing system that the graphics processor 2 is part of via a pair of hardware-controlled buffers 35, 36. As will be discussed further below, these hardware control buffers 35, 36 operate in the manner of the technology described herein to determine the memory addresses for data for work items (such as vertices or primitives) in work item packets that are stored or to be stored in the memory system 6.

In the present embodiments, the shader cores 32 are operable to execute both "compute" shader programs (to perform so-called compute shading) and fragment shader operations. Thus as shown in FIG. 3, each shader core 32 comprises an appropriate compute endpoint 37 and an appropriate fragment endpoint for a fragment processing (shading) stage 38 that act as the control interface for performing compute shading and fragment processing, respectively, and that will, for example, and in an embodiment, trigger the execution core 33 to execute the appropriate compute shading or fragment shading tasks, as required.

As shown in FIG. 3, the compute endpoint 37 and fragment endpoint for the fragment processing (shading) stage 38 receive appropriate processing tasks from a job control unit 39 of the graphics processor 2, which job control unit 39 includes an appropriate compute scheduler 40 and fragment iterator 41 for distributing processing jobs that the job controller 39 receives as appropriate processing jobs to the shader cores 32.

As discussed above, when performing graphics processing, there will typically be an initial geometry processing stage that determines the vertex and other data that is necessary for generating the graphics processing output in question, which will then be followed by a rendering/fragment processing stage for processing (rendering) that geometry.

In the present embodiments, the geometry processing is performed, as shown in FIG. 3, by a geometry packet pipeline 42 of the graphics processor 2. This geometry packet pipeline is operable to trigger the performance of one or more "geometry" shader stages (which shader stages themselves will be executed by the shader cores 32, under the control of the geometry packet pipeline 42).

For example, as shown in FIG. 3, the geometry packet pipeline 42 comprises an input packetizer 43 that can trigger position shading and vertex shading 50 by the shader cores 32. It also includes further shader stage circuits 14, 15, 16 that are operable to trigger compute shaders 5 for performing geometry processing, such as task shaders, mesh shaders, tessellation shaders, etc., (which again will be executed by the shader cores 32).

As shown in FIG. 3, the geometry packet pipeline 42 has an appropriate interface 47 to the compute scheduler 40 of the job control unit 39, via which it can control and trigger the performance of appropriate geometry shading operations by the shader cores 32.

The overall operation of the geometry packet pipeline 42 is controlled by the job control unit 39 (by a geometry iterator 48 of the job control unit 39) which distributes the appropriate geometry processing jobs and tasks to the geometry packet pipeline 42.

The graphics processor 2 of FIG. 3 is configured to perform rendering in a tile-based manner (as discussed above). To facilitate this, as shown in FIG. 3, each shader core 32 also includes a distributed binning core 49 that is operable to generate appropriate data structures for determining which primitives need to be processed for respective rendering tiles of the output being generated.

In the present embodiments, the distributed binning cores 49 generate hierarchies of bounding boxes for primitives and primitive packets (that contain primitives to be rendered) (which are then used at the rendering/fragment processing stage to identify those primitives that need to be processed for a respective tile).

The distributed binning cores 49 may also cull primitives that are not visible (e.g. that fall outside the view frustum, and/or based on the facing direction of the primitives).

The distributed binning cores 49 can operate in any suitable and desired manner for this purpose.

As shown in FIG. 3, the distributed binning cores 49 of the shader cores 32 may trigger vertex shading 53, such as varying shading, as part of their operation (e.g. where varying shading was not performed by the input packetizer as part of the input packetizer 43 operation).

In the present embodiments, the rendering/fragment processing is performed by executing appropriate fragment processing operations on a shader core 32 under the control of the fragment endpoint for the fragment processing (shading) stage 38. To facilitate this, as shown in FIG. 3, the fragment endpoint for the fragment processing (shading) stage 38 of each shader core is operable to trigger appropriate fragment shader operation 52 by a shader core.

As will be appreciated from the above, in operation of the present embodiments, the geometry packet pipeline 42 that performs the geometry processing will generate appropriate geometry data, such as (transformed) vertex positions, vertex varyings, and primitive attributes (which data can be respectively considered to be corresponding data elements (e.g. positions or varyings, in the case of vertices) for corresponding work items (e.g. vertices)), which data will then be used, for example, by the binning/tiling processing and rendering/fragment processing of the later stages of the graphics processing pipeline.

In the present embodiments, the geometry packet pipeline 42 operates to generate respective geometry packets containing the data that it generates. In the present embodiments, those geometry packets are then processed by the distributed binning cores 49 to generate corresponding primitive packets, which primitive packets are then used by the fragment processing (fragment shaders) 52.

Thus, in the present embodiments, the geometry packet pipeline 42 will generate work item packets, in the form of geometry packets, that store data elements (attributes) for work items (such as vertices and primitives), which geometry packets will then be read and used by the distributed binning cores 49. Correspondingly, the distributed binning cores 49 will generate appropriate primitive packets storing data elements (attributes) for work items, such as vertices and primitives, which primitive packets will then be read and used by the fragment processing 38.

In order to facilitate this operation, in the present embodiments, and in accordance with the technology described herein, the relevant data elements (attributes) for the work items in a work item packet are stored as one or more groups of N data elements in the packet, and then an identifier for the work item (e.g. vertex) configured such that the first part of the work item identifier indicates an offset for the group of data elements that the data element for the work item belongs to relative to a base address, and a second, different part of the work item identifier indicates the relative position of the data element for the work item within the group of N data elements that the data element belongs to, is used to determine the memory address where the data element in question should be/is stored (should be stored or read from, as appropriate).

Figure 4:
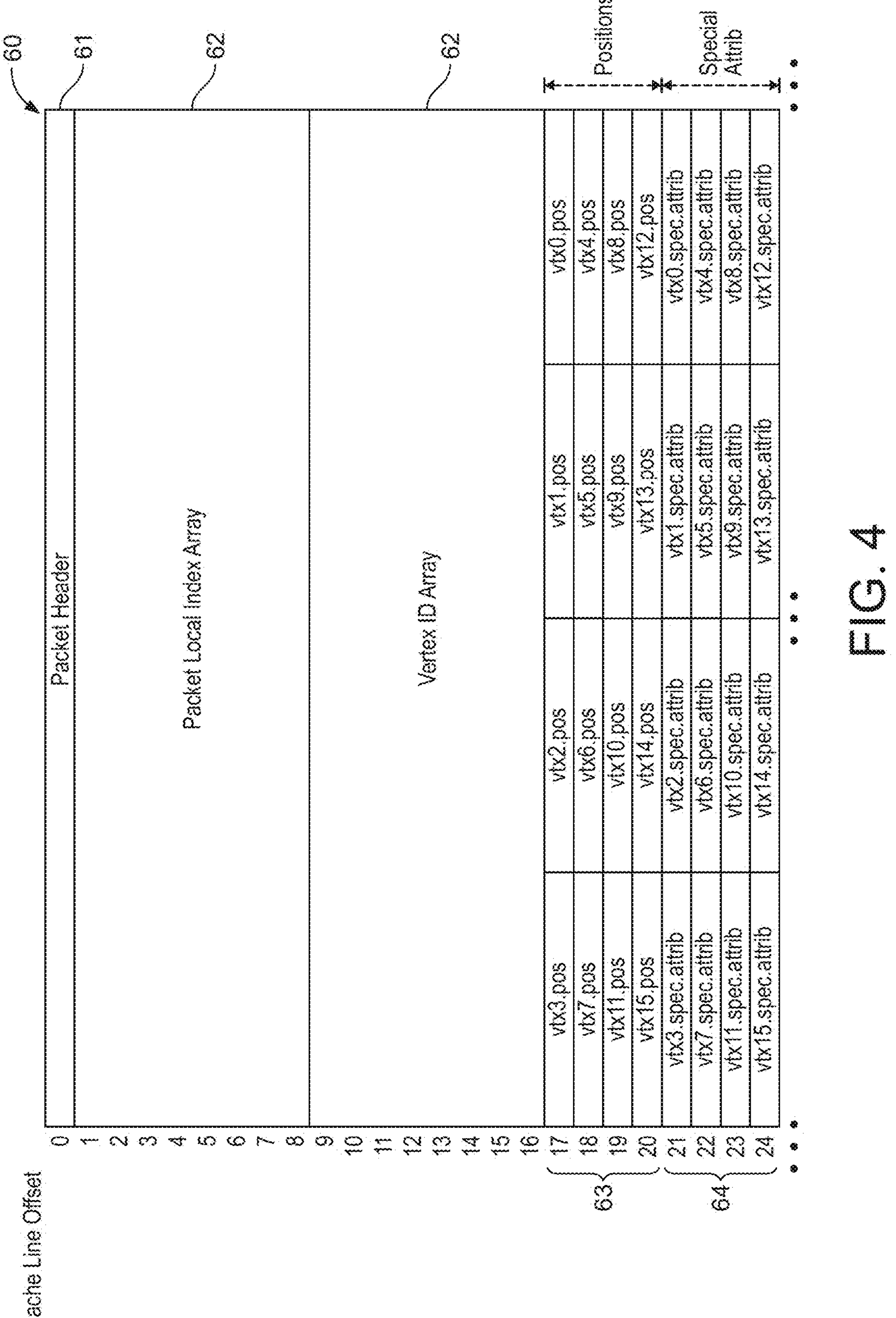
FIG. 4 shows an example geometry packet in an embodiment of the technology described herein.

FIG. 4 shows the layout of a geometry packet 60 that may be produced by the geometry packet pipeline 42 in the present embodiments. FIG. 4 shows all the data that may be stored in a geometry packet 60 in the present embodiments, but as will be discussed further below, not all the sets of data elements (attributes) shown in the geometry packet 60 in FIG. 4 may be stored in a geometry packet, in dependence upon what particular geometry processing is performed by the geometry packet pipeline 42.

FIG. 4 shows the "cache line" layout of a geometry packet 60. Each cache line is assumed to be 64 MB, but other sizes of cache line would be possible (e.g. depending on how the memory system is configured).

As shown in FIG. 4, the geometry packet 60 first contains a packet header 61. This may include, inter alia, a pointer to a descriptor for the draw call that the packet relates to. In the example geometry packet shown in FIG. 60, the packet header occupies a single cache line.

The header is then followed by a packet local index array 62 which defines the primitives that the packet contains with reference to the vertices that packet relates to using a sequence of indices for the vertices that the geometry packet 60 relates to that (uniquely) identify the vertices within (and with respect to) the packet.

The geometry packet 60 may then include a vertex ID array 62 that stores (other) identifiers for the vertices that the geometry packet 60 relates to, that identify the input vertices for vertex shading.

The geometry packet 60 then contains one or more sets of data elements (attributes) for respective work items (vertices and primitives) that the packet relates to (and stores data for).

In the exemplary geometry packet 60 shown in FIG. 4 it is assumed that the geometry packet will store data elements (attributes) for both vertices and for primitives, but this is not necessary, and a geometry packet could, for example, only store data elements for vertices, if desired (and in dependence upon the desired geometry processing for the render output being generated).

As shown in FIG. 4, the data elements for the vertices are stored first, followed by the data elements for the primitives (if any).

In the case of the vertices, the geometry packet 60 shown in FIG. 4 stores positions, "special attributes", and varyings. However, again this is not necessary, and the geometry packet may only store, for example, positions, or positions and varyings, if desired (in dependence upon whether the geometry processing that is performed generates any special attributes for vertices and any varyings for vertices). (As shown in FIG. 3, varying shading, for example, can instead be performed as part of the distributed binning core 49 operation, in which case the geometry packet pipeline 42 may not generate any varyings as part of its processing.)

In the case of primitives, the geometry packet 60 is shown in FIG. 4 as containing both special attributes for primitives, and user attributes for primitives. Again, one or both of these sets of primitive attributes may be omitted, depending upon the processing being performed by the geometry packet pipeline 42.

As shown in FIG. 4, each respective type of data element (e.g. vertex positions, vertex special attributes, vertex varyings, primitive special attributes and primitive user attributes) is stored in the geometry packet 60 as respective groups of 16 data elements corresponding to the data elements (of the type in question) for a respective group of 16 work items (either vertices or primitives). (The number of data elements per group can be other than 16, if desired.)

Furthermore, the different sets of groups of 16 data elements (attributes) for the respective work items are stored in an interleaved fashion in the geometry packet 60, i.e. such that the first group of 16 vertex positions 63 is then followed by a corresponding group of 16 vertex special attributes 64 for the vertices in question which is then followed by a set of 16 varyings 65 for the vertices in question. There is then a next group of 16 positions 66 for the next 16 vertices that the geometry packet relates to (stores data for) and so on.

Correspondingly, in the case of primitive attributes, a group of 16 primitive special attributes 67 is followed by a group of 16 primitive user attributes 68 for the 16 primitives that the preceding special attributes relate to, and so on.

FIG. 4 shows a geometry packet that stores 32 vertices and 32 primitives (so there are two respective groups of 16 vertex positions, two groups of 16 vertex special attributes and two groups of 16 vertex varyings, and two groups of 16 primitive special attributes and two groups of 16 primitive attributes).

In general a geometry packet will store up to a set number of vertices and primitives (which may be set on a geometry packet-by-geometry packet basis, depending on the geometry processing that is being performed). In the present embodiments geometry packets can be set to store 16, 32, 64, 128 or 256 vertices and/or primitives.

In the present embodiments, each data element (attribute) that is stored for a work item has the same size as all other data elements (attributes) of that type that are stored in the geometry packet. Thus, for example, each position that is stored in the geometry packet will have the same (data) size, as will each varying, and so on.

In the present embodiments, it is assumed that each vertex position comprises 16 bytes, such that four positions may be stored in a single (64 byte) cache line, and a group of 16 positions will correspondingly (exactly) fill four cache lines.

(The sizes of the different data elements (e.g. positions, special attributes, varyings, etc.) need not be the same as shown in FIG. 4.)

As shown in FIG. 4, each respective group of 16 data elements (attributes) that is stored in the geometry packet 60 is aligned to and starts at the beginning of a cache line. In the case where the data element (attribute) size means that a given group of data elements (attributes) does not exactly fill an integer number of cache lines, then any unused space at the end of a group at the end of a cache line is simply left unused (e.g. padded with zeros), with the next group of data elements in the packet starting at the next cache line.

In order to allow for the fact that a geometry packet produced by the geometry packet pipeline 42 may, as discussed above, contain different sets of data elements and data elements for different types of work items, in the present embodiments, each geometry packet 60 has associated metadata, in the form of a packet descriptor 70 (see FIG. 3).

In the present embodiments, this metadata (packet descriptor) 70 can be used to indicate, as shown in FIG. 3; an offset (in terms of a number of cache lines) into the packet where the first group of data elements (attributes) for vertices are stored (a "vertex offset"); respective indications (e.g. flags) indicating whether the geometry packet stores special attributes for vertices and varyings for vertices ("vertex special attribute enabled" and "varyings enabled", respectively); an indication of the data size (stride) for each varyings data element ("varying stride") (if any) that is stored in the geometry packet; an indication of whether the geometry packet stores data elements for primitives (primitive attributes) ("primitive attribute enabled"); an indication of the offset from the start of the geometry packet to the start of the primitive attributes in the packet ("primitive attribute offset"); an indication of whether the packet stores primitive special attributes ("primitive special attribute enabled"); and an indication of the size of the primitive attribute data elements (stride) (if any) that are stored in the packet ("primitive attribute stride").

Other types and forms of metadata, e.g. describing the content of a packet would, of course, be possible.

When generating a geometry packet, the processing performed for and by the geometry packet pipeline 42 will need to store the relevant data that it is generating (and where appropriate retrieve data that it is to process from a geometry packet) in an appropriate manner. In the present embodiments, the geometry packets are stored in the memory system 6 of the data processing system by the (execution cores 33) of the shader cores 32 of the graphics processor 2 as the shader cores perform the necessary geometry processing (geometry shading). As discussed above, and as shown in FIG. 3, the execution cores 33 can access the memory system 6 for this purpose via hardware controlled buffers 35, 36.

In order to be able to do this, the memory address for storing or for reading a desired data element (attribute) for a work item (e.g. vertex or primitive) for a geometry packet will need to be determined. In the present embodiments, the memory addresses for data elements for work items in a geometry packet are determined in accordance with the technology described herein, i.e. using an identifier for the work item that the data element is for, which identifier is configured such that a set of the most significant bits of the identifier (comprising a first part of the identifier) indicate an offset for the start of the group of data elements that the data element in question belongs to from a base address, and such that a set of least significant bits of the identifier (comprising a second part of the identifier) indicate the relative position of the data element for the work item that the data element relates to in the group of data elements in the packet in question.

In the present embodiments, each work item identifier used for this purpose comprises 32 bits. As the data is stored in groups of 16 data elements in the work item packets (as discussed above), the four least significant bits of the work item identifiers are used to indicate the relative position of the data element for the work item that the data element relates to in the group of data elements in the packet in question. The 28 most significant bits of the work item identifier are then used to indicate the offset for the start of the group of data elements from a base address. In the present embodiments, this offset is indicated in terms of a number of cache lines from the base address.

Thus, in the present embodiments, the memory address for a data element to be stored/stored in a work item (e.g. geometry) packet is determined as follows:

$$\text{memory address for data element} = \text{base\_address} + (IDX[31:4] * \text{cache line size}) + (IDX[3:0] * \text{stride})$$

where IDX is the work item identifier (for this purpose) for the work item in question;

IDX[31:4] is used as a cache line offset; and stride is the (data) size of the data element "type" in question (thus for vertex positions, the stride will be 16 bytes).

Figure 5:
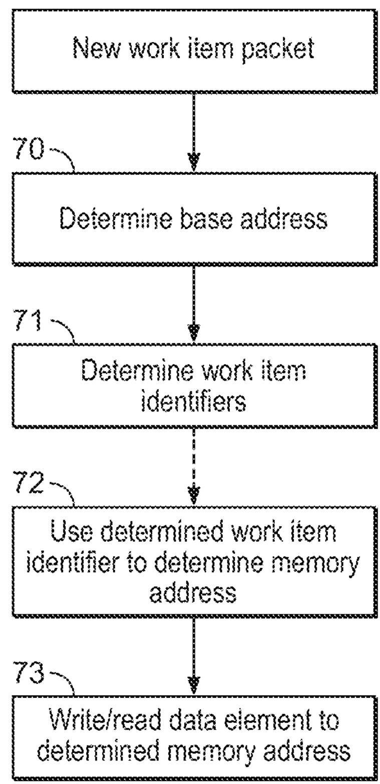
FIG. 5 shows the operation when determining a memory address for a data element in a work item packet in an embodiment of the technology described herein.

FIG. 5 shows the operation when determining a memory address for a data element in a work item packet that is performed in the present embodiments.

As shown in FIG. 5, when determining the memory address for a data element in a work item packet, first a base address to be used in relation to the work item packet is determined (step 70). A data size (stride) for the data element may also be fetched at this point.

This base address may be newly determined for the work item packet in question, or, as will be discussed further below, it could be a base address that was determined for a previous work item packet, but which can be reused for the present work item packet.

Appropriate work item identifiers are then determined for the work items for the data elements in question (step 71), based on the cache line offset from the base address to the start memory address for the group of data elements that the data element in question belongs to, and the relative position of the data element for the work item in question in the group of data elements that it belongs to.

Then, when a data element for a work item is to be stored in or read from the packet, the first part of the generated identifier for the work item that indicates the cache line offset from the base, and the second part of the work item identifier in question are used, together with the determined base address and the size (stride) for the data elements in question, as discussed above, to determine the memory address at which the data element in question should be/is stored (step 72).

The data element is then written to or read from the determined memory address accordingly (step 73).

The generation and use of work item packets using this process in the present embodiments will now be described in more detail, starting with the generation of geometry packets by the geometry packet pipeline 42.

As shown in FIG. 3, when generating a geometry packet, the input packetizer 43 of the geometry packet pipeline 42 will first cause the shader cores 32 to perform appropriate vertex shading 50. This may comprise performing only vertex position shading (in which case the geometry packet will only contain vertex positions), but as shown in FIG. 3 could also comprise "full" vertex shading, including varying shading and vertex special attributes shading (in which case the geometry packet 50 will contain all those attributes as well, as shown in FIG. 4).

The new geometry packet that is being generated will be stored in a geometry buffer in the memory system 6. In the present embodiments, in order to access the geometry buffer in the memory system 6, the vertex shader (whether only performing position shading, or performing position and other vertex attribute shading) accesses the memory system 6 using and via one or more of the hardware controlled buffers 35, 36.

In order to do this, the or each hardware controlled buffer is configured with a base address and a stride (for the data elements in question), and is operable to use that set base address and stride, together with the appropriate vertex identifier (which it will receive from the execution core 33) to determine the memory address for the data element (vertex attribute) that is being written out (and to then write that data element (vertex attribute) to the determined address in the (geometry buffer in the) memory system 6).

In the present embodiments, and as shown in FIG. 3, one hardware controlled buffer (in the present embodiments the first hardware controlled buffer 35) is used to determine and access the memory locations for vertex positions (when performing position or vertex shading), with the other (the second) hardware controlled buffer 36 then being used to determine and access the memory addresses for the varyings (where vertex shading including varying shading is being performed).

In the case of the hardware controlled buffer 35 that is being used for the vertex positions, the base address to be used by that "position" hardware controlled buffer is set to the geometry buffer base address, and the stride for the hardware controlled buffer that is being used to determine the memory addresses for the positions is set to 16 bytes (as that is the size of a position in the present embodiments).

The vertex identifiers that are then used for determining memory addresses (and that are provided to the hardware control buffer 35 that is handling the positions) are then generated based on the offset from the base address for the geometry buffer to the start of the group of 16 vertex positions that the position for the vertex in question is to belong to, and the relative position for that vertex within the group of vertex positions in question.

In the present embodiments, the execution cores 33 are assumed to be able to process thread groups (warps) of 16 threads, such that one thread group (warp) will (when performing position shading) generate positions for a complete group of 16 positions (vertices). In this case therefore the second part of the vertex identifier that is used for determining the memory addresses is simply set to the thread number within the thread group (warp) in question. (The vertex identifiers will be generated by the input packetiser 43, for example, as a packet is generated.)

Thus, for the exemplary geometry packet shown in FIG. 4, for the first group of 16 vertex positions 63 to be stored in that geometry packet (and assuming that the geometry packet starts at the base address for the geometry buffer), then that first group of vertex positions will be at a cache line offset of 17 and so the first parts of the vertex identifiers for the vertices in that group should be "17", such that the vertex identifiers used for the thread group (warp) that is generating that first group of vertex positions 63 will then be 0x110-0x11f. Correspondingly, for the next group of 16 vertex positions 66, the vertex identifiers used for the memory address determinations will be 0x1f0-0x1ff.

These vertex identifiers will then be provided to the hardware control buffer 35 for it to then determine the appropriate memory addresses for the positions for the vertices in the geometry packet.

In the case where vertex special attributes are being generated, then in the present embodiments the operation is configured such that the vertex special attributes are always located immediately after the positions (for the corresponding set of vertices) and so will be always located 256 bytes after the corresponding position (as a group of 16 positions occupies 256 bytes). This 256 byte offset is thus added to the address for the position for a vertex to determine the address of any special attributes for that vertex from the memory address for the position.

In the case of varying shading, in the present embodiments, in order that the same vertex identifier for the vertex can be used to access both a position and a varying (where present) in a geometry packet (such that generating a second set of vertex identifiers for accessing the varyings for the vertices in a geometry packet is not necessary), and as shown in FIG. 3, the memory addresses for the varyings (if present) are determined and accessed using the second hardware controlled buffer 36, which is configured with a different base address and stride to the first hardware control buffer 35 that is being used to determine and access the memory addresses for the positions (as it is being used to determine and access the memory addresses for the varyings).

In particular, the second hardware controlled buffer 36 that is to be used to determine and access the memory addresses for the varyings has its base address set to the base address that is used for accessing the positions plus an offset (which will be known) for the start of a group of varyings in the geometry packet from the start of the corresponding group of positions in the geometry packet.

Thus, in the case where a geometry packet contains only positions and varyings to be stored in an interleaved manner, the base address for determining the memory addresses for the varyings will be set to the base address for determining and accessing the memory locations for the positions plus 256 bytes (being the size of a group of 16 positions). In the case where a geometry packet also includes special attributes, then the base address for determining the memory addresses for the varyings will be set to the base address for the positions plus the size of a group of 16 positions and the size of a group of 16 special attributes. Thus where a group of 16 vertex special attributes also comprise 256 bytes, the base address for determining and accessing the varyings in the geometry packet will be set to the base address that is being used for accessing the positions in the geometry packet plus 512 bytes.

Correspondingly, the stride to be used by the hardware control buffer 36 for determining and accessing the memory addresses for the vertex varyings will be set to the data size of the varyings for a vertex (the varyings stride).

This then means that the same vertex identifiers can be used to determine and access the memory addresses for both the positions and the varyings for a vertex via the hardware control buffers 35, 36.

Thus, when the input packetizer 43 of the geometry packet pipeline 42 is triggering the performance of position/vertex shading to generate a geometry packet, there will first be a request for a memory allocation for the geometry buffer where the geometry packet is to be stored. Once this memory allocation has been granted, then the appropriate hardware controlled buffer or buffers will be configured with their respective base address and stride (as discussed above). A set of vertex identifiers for the vertices that the packet relates to to be used for determining the memory addresses for the appropriate data elements (attributes) for those vertices will then be generated accordingly. The position/vertex shading is then requested, using the determined vertex identifiers to identify the vertices, and performed by the execution cores 33. The generated vertex attributes (e.g. transformed positions) are written out to the geometry packet in the memory system 6 via the hardware controlled buffer or buffers.

As shown in FIG. 3, as well as the input packetizer 43 performing position/vertex shading when generating a geometry packet, the geometry packet pipeline 42 also includes further shader stages 44, 45, 46, that can perform, as shown in FIG. 3, respective compute shading operations 51. These compute shading operations may comprise, for example, tessellation shading, geometry shading, transform feedback shading, mesh shading or task shading.

Again, when performing compute shading for a geometry packet, the memory addresses for data elements (attributes) that are being generated by the compute shading process, and/or that are to be read from a geometry packet for use by the compute shading process, are determined in the manner of the technology described herein, i.e. in particular by using appropriate work item (vertex or primitive) identifiers in the manner of the technology described herein.

However, for compute shader operation, in the present embodiments, rather than using one or more of the hardware controlled buffers 35, 36 for accessing the geometry packets in the memory system 6, instead the compute shaders are configured to determine the relevant memory addresses to be accessed themselves (but still in the manner of the present embodiments and the technology described herein).

In this case, the compute shading operation will use (and has access to) a descriptor for the geometry packet (as discussed above) and a pointer to the geometry packet. It then uses this information to determine an appropriate base address and work item (vertex or primitive, as appropriate) identifier for a data element.

In particular, the packet descriptor 70 provides, as discussed above, offsets within the geometry packet for the different sections (vertex and primitive attributes), and indications (enabled bits) for the optional sections of the packets (vertex varyings, vertex special attributes, primitive attributes, and primitive special attributes).

The compute shader operation can then use this information to determine the memory address for a given data element in a geometry packet.

In particular, the compute shader can set the base address to the start address for the packet (based on the pointer to the packet), and then use the indicated offset or offsets within the packet for the different sections in the packet, together with the sizes of the different sections in the packet (which can be determined from the number of data elements in the group and the indicated size (stride) of those data elements), together with an appropriate identifier for the work item in question to determine the memory address.

In order to determine the appropriate work item identifier to use for determining the memory address in this regard, the compute shader will use the packet local index for the work item in question (which as discussed above will simply index the work items (e.g. vertices) in the packet in sequence). Thus from the packet local index for the work item in question, the group of 16 data elements for that work item, and the relative position of that work item in that group of 16 data elements can be determined.

This information can then be used together with the appropriate offsets, to determine the offset to the relevant group of data elements for the data element for the work item (e.g. vertex) in question, and the offset within that group of data elements for the data element for the work item in question.

In the present embodiments, the primitive attributes shown in the geometry packet 60 are, if present, generated by executing an appropriate compute shader (e.g. mesh shader) as part of the geometry packet pipeline 42. The primitive attributes (if any) in a geometry packet 60 are used and consumed by a distributed binning core 49 for its operation, when processing a geometry packet to generate a primitive packet.

As discussed above, the geometry packets produced by the geometry packet pipeline 42 are used by the distributed binning cores 49 when they are generating the appropriate binning data structures (bounding box hierarchies) that are to be used to identify primitives to be processed for respective rendering tiles when performing fragment shading.

As part of this processing, the distributed binning cores are operable to cull primitives that are present in geometry packets that fall outside the view frustum and/or based on the facing directions of the primitives.

In the present embodiments, to do this, the distributed binning cores generate respective primitive (polygon) packets from the geometry packets that they process. One primitive packet contains primitives and vertices from one geometry packet, but will normally include less vertices and primitives since culled primitives and vertices are not included in the primitive packet. Any special vertex and primitive attributes that were present in the geometry packet are consumed by the distributed binning cores and either used during binning or encoded in the primitive metadata section of the corresponding primitive packet, as required.

Figure 6:
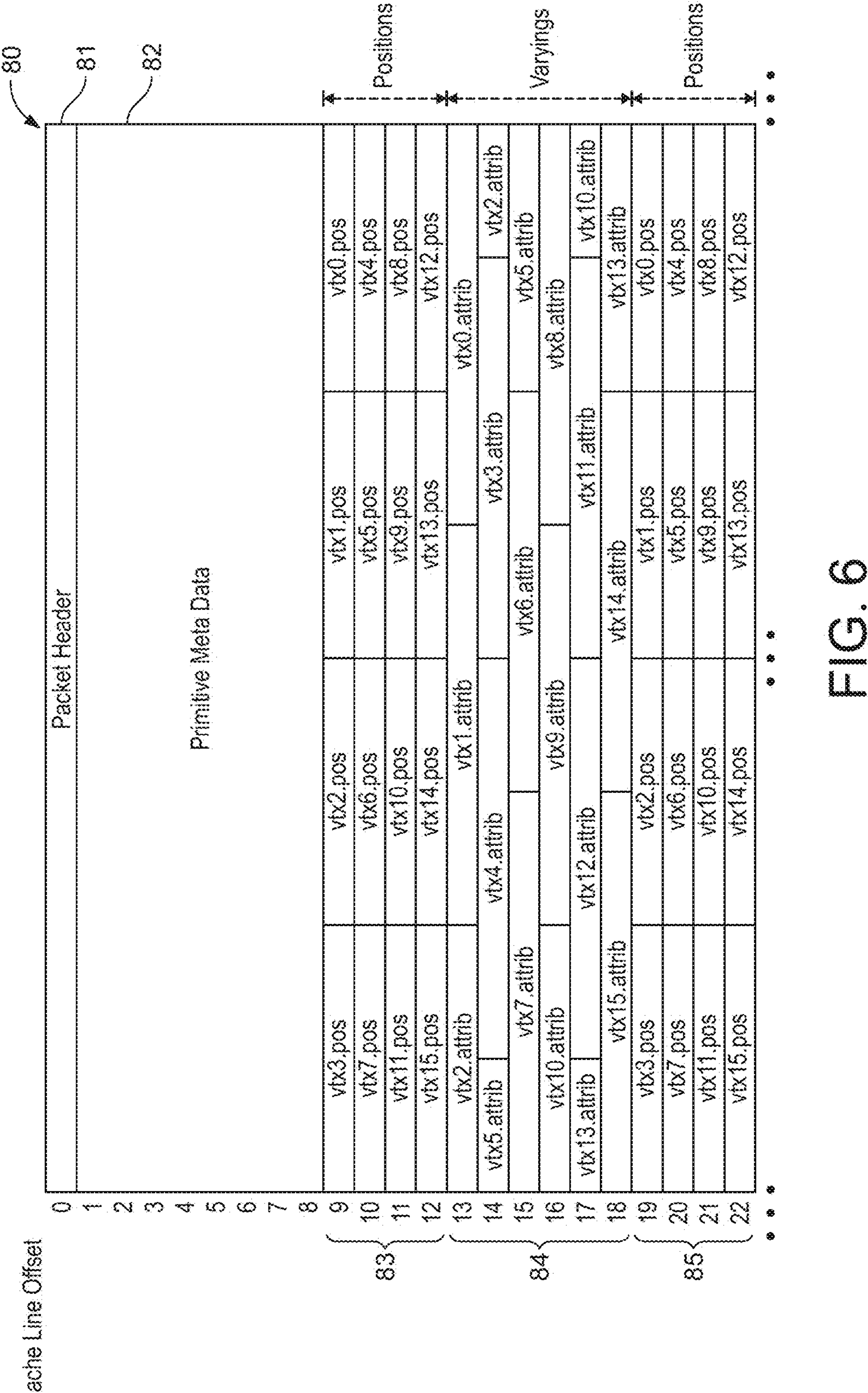
FIG. 6 shows an example primitive packet in an embodiment of the technology described herein.

FIG. 6 shows an exemplary primitive packet 80 that may be generated by a distributed binning core from a polygon packet in the present embodiments.

As shown in FIG. 6, the primitive packet 80 again includes a packet header 81 and primitive metadata 82.

Again, the packet header 81 may contain, for example, a pointer to a draw call descriptor for the draw call to which the primitive packet 80 relates.

Similarly, the primitive metadata 82 may comprise a set of "external" indices identifying the vertices that the packet relates to, and also a set of "external" primitive identifiers identifying the primitives that the packet relates to.

The primitive metadata 82 also comprises a set of information indicating the vertices that each primitive that the primitive packet relates to contains. This primitive-defining information uses "local" indices for the vertices, i.e. defines each primitive with respect to "packet-local" indices that uniquely index the vertices within the set of vertices that the packet relates to.

The primitive metadata 82 also contains a bounding box for each primitive that the packet relates to.

The primitive metadata 82 may also include further metadata, such as data generated from processing of special vertex and primitive attributes, as discussed above.

This data is then followed by respective groups of data elements for work items that the primitive packet 80 relates to, in a corresponding manner to the geometry packets. Thus, as shown in the exemplary primitive packet 80 shown in FIG. 6, there is firstly a group of 16 positions 83 for the first set of 16 vertices that the packet relates to, followed by a group of 16 varyings 84 for the first 16 vertices that the primitive packet relates to (stores data for), followed by a second group of vertex positions 85 and a second group of varyings 86.

The vertex data elements (attributes) are then followed by respective groups of primitive user attributes for respective groups of 16 primitives, 87, 88.

Again, the primitive packet 80 shown in FIG. 6 is shown as containing 32 vertices and 32 primitives, but other numbers of vertices and primitives would, of course, be possible.

When accessing the data elements for primitives and vertices in a geometry packet, and storing data elements for primitives and vertices in a primitive packet, the distributed binning cores will determine the memory addresses to be used for the respective data elements in the packets in the manner of the present embodiments (as discussed), using the geometry packet pointers and appropriate geometry packet information (as discussed above) to determine appropriate base addresses and work item identifiers for that purpose. (The geometry packet information may be determined from predetermined layout requirements for the packets, information in the packet header, and/or a packet descriptor, etc., as desired.)

In the present embodiments, each distributed binning core has a memory address determining circuit 54 (fixed function hardware) for determining the memory addresses in this manner.

Other arrangements would, of course, be possible.

As shown in FIG. 3, the distributed binning cores are also able to trigger the performance of varying shading 53 as part of their operation. This may be done, for example, where the input packetizer 43 only performed position shading and not full vertex shading. In the case varying shading is being performed as part of the distributed binning core operation, then in that case the appropriate memory addresses for storing the vertex varyings in an appropriate packet that is produced by the varying shading operation is performed via appropriate configuration of the second hardware controlled buffer 36 (as discussed above).

The primitive packets produced by the distributed binning cores 49 are used by (consumed in) the fragment processing (shading) stage 38 of the graphics processing pipeline and graphics processor.

Figure 7:
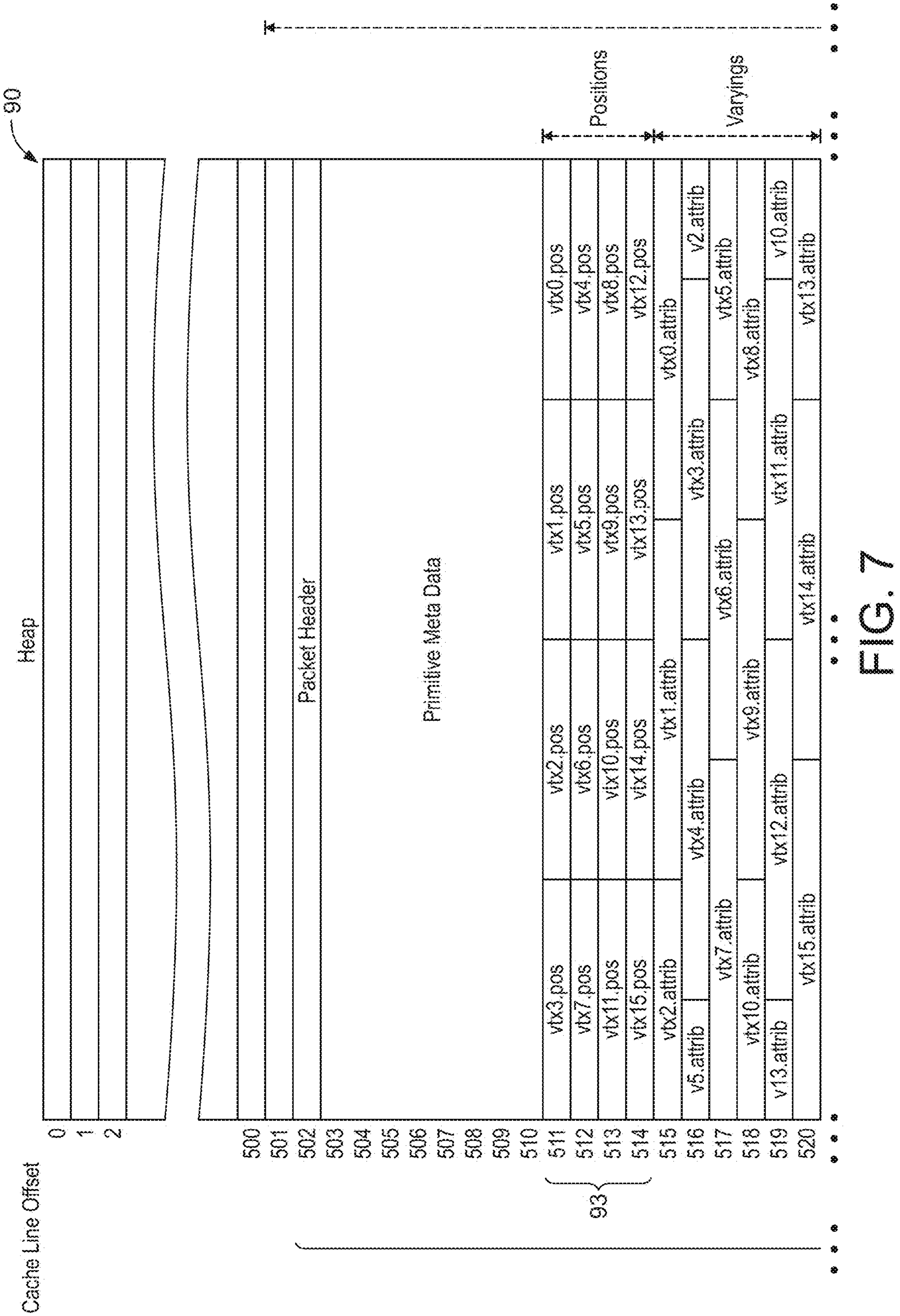
FIG. 7 shows exemplary primitive packets stored in memory in an embodiment of the technology described herein.

FIG. 7 shows an exemplary part 90 of a memory heap, storing two primitive packets 91, 92 that have been generated by a distributed binning core or cores. Each primitive packet has an associated bounding box that has been generated by the distributed binning core that can be tested against a rendering tile being generated in order to determine whether the primitive packet needs to be processed for the tile in question.

In the present embodiments, the vertex positions in a primitive packet are accessed for the fragment shading process by a vertex loader 55 in the fragment processing (shading) stage 38. Vertex varyings and primitive attributes in a primitive packet are accessed by the execution core when executing fragment shading using the hardware controlled buffers 35, 36.

To facilitate this operation, the fragment processing (shading) stage 38 includes a primitive packet decoder (decoding circuit) 56 that is operable both to determine which primitive packets need to be processed for a rendering tile, and to, for packets that are to be processed for a rendering tile, determine the appropriate base addresses, work item identifiers, and configure the hardware controlled buffers, etc., accordingly.

Thus, when a tile is to be rendered, the polygon packet decoder 54 first walks through the primitive packet bounding box hierarchy generated by the distributing binning cores to identify packets with a bounding box that cover the tile in question. In the present embodiments, to do this, the primitive packet decoder reads an entry in the bounding box hierarchy data structure that contains the bounding boxes for packets and pointers to the packets.

When a packet that applies to the tile being processed is identified (from the bounding box for the packet), the primitive packet decoder 54 then reads the packet header 81 (using the pointer to the packet) and reads the relevant primitive metadata 82 to find primitives in the primitive packet that apply to the tile in question.

If there are primitives within the packet that touch the tile, then the packet will need to be processed for the tile in question.

When the packet being processed for the tile is the first packet for a draw call, the primitive packet decoder will first configure the hardware control buffers 35, 36 to be able to access the data elements in the packet. To do this, it selects a base address to be used for the packet (as discussed above). In the present embodiment, a base address that is lower than the address of the packet (which will be known from the pointer to the packet), in an embodiment that is on a 2 MB boundary before the current packet is set as the base address. (This should then allow the same base address to be used for other packets later in the draw call that were processed out of order and written before the current primitive packet.)

Once the base address has been determined, then the second hardware controlled buffer 36 that will be used to access the vertex varyings when performing fragment shading has its base address set to the selected base address plus 256 (being the size of 16 vertex positions) and the stride set equal to the varyings stride (as indicated by the packet descriptor).

The first hardware controlled buffer 35 that is used to access the primitive attributes has its base address set to the determined base address and the stride equal to the primitive attribute stride (as indicated by the packet descriptor).

The determined base address is also provided to the vertex loader 55, so that it can use that base address to fetch the vertex positions from the primitive packet.

The polygon packet decoder then also needs to determine the appropriate work item identifiers to be used for accessing the data elements for the vertices and primitives that the primitive packet relates to.

To do this, the primitive packet decoder 54 converts the packet local primitive and vertex indices that are used for defining the primitives "within" the primitive packet to appropriate "internal" vertex identifiers and "internal" primitive identifiers to be used for determining the memory addresses, appropriately.

Thus, the packet local vertex indices used for defining the primitives in the packet are converted to appropriate "internal" vertex indices based on the cache line offset from the determined base address to the beginning of the vertex group containing the vertex and the entry number for the vertex for the group in question (which can be determined from the packet local vertex index for each vertex).

Thus, for example, for the primitive packets shown in FIG. 7, the internal vertex identifiers for those packets, assuming the base address is set at offset 0 will be as follows:

first group of vertex positions 93 in the first packet 91 at cache line offset 511: 0x1ff0-0x1fff;

second group of vertex positions 94 in the first packet 91 at cache line offset 521: 0x2090-0x209f;

first group of vertex positions 95 in the second packet 92 at cache line offset 552: 0x2280-0x228f; and second group of vertex positions 96 in the second packet 92 at cache line offset 562: 0x2320-0x232f.

Correspondingly, the packet local primitive index is converted to an "internal" primitive index to be used for determining the memory address using the cache line offset from the determined base address to the beginning of the primitive data element group containing the data element for the primitive in question and the entry number of the primitive in question in that group.

Thus, for example, for the primitive packets shown in FIG. 7, the internal primitive identifiers for those packets, assuming the base address is set at offset 0 will be as follows:

first group of primitive attributes 97 in the first packet 91 at cache line offset 531: 0x213-0x213f;

second group of primitive attributes 98 in the first packet 91 at cache line offset 537: 0x2190-0x219f;

first group of primitive attributes 99 in the second packet 92 at cache line offset 572: 0x23c0-0x23cf; and second group of primitive attributes 100 in the second packet 92 at cache line offset 578: 0x2420-0x232f.

This will accordingly generate for each primitive that is to be processed, an "internal" primitive identifier and three "internal" vertex identifiers indicating the vertices for the primitive (it is assumed in this regard that the primitives are triangles). Thus, each primitive will now be defined as:

(3*vertex_internal_ids,primitive_internal_id)

where:

vertex_internal_id is the identifier to be used for determining the memory address for attributes for the vertex in question in the work item packet; and primitive_internal_id is the identifier to be used for determining the memory address for attributes for the primitive in question in the work item packet.

Each such primitive defined in this way is then output from the primitive packet decoder to the vertex loader 55. The vertex loader uses the generated "internal" vertex identifiers for the vertices for a primitive to determine the memory addresses for the positions for those vertices:

$$\text{address} = \text{base address} + \text{internal vertex } ID[31:4] * 64 + (\text{internal vertex } ID[3:0] * 16).$$

The vertex loader then fetches the positions for the vertices for the primitive from the determined memory addresses.

Appropriate triangle setup and rasterisation of the primitive using the fetched positions is then performed, to rasterise the primitive to fragments.

A fragment shader 52 is then run per fragment, with the fragment shader accessing the varyings for the vertices for a primitive using the appropriate internal vertex ID and the configured second hardware controlled buffer 36, and accessing any primitive attributes in the primitive packet for the primitive using the appropriately configured first hardware controlled buffer 35 and the internal primitive ID (as discussed above).

Once the primitives in a first packet for a draw call have been processed, then a next primitive packet for the draw call will be processed in a similar manner, and so on, until all the primitive packets for the draw call in question that apply to the tile being rendered have been processed. As discussed above, in an embodiment a base address is selected for the first packet in a draw call that can be used for subsequent primitive packets in the draw call. Thus a new base address is only determined and set in the case where the memory addresses for a primitive packet cannot be indicated from the already set base address using the address range that the "internal" primitive and vertex identifiers are able to indicate.

As will be appreciated by those skilled in the art, the technology described herein, in embodiments at least, can provide a more efficient and more flexible mechanism for storing and reading data elements for work items, such as attributes and primitives and vertices, in a graphics processing pipeline, and in particular that can facilitate using the same memory addressing mechanism for different stages of a graphics processing pipeline.

This is achieved, in embodiments of the technology described herein at least, by using identifiers for work items configured such that a first part of a work item identifier indicates an offset for a group of N data elements that the data element for the work item belongs to relative to a base address, and a second, different part of the work item identifier indicates the relative position of the data element for the work item within the group of N data elements that the data element for the work item belongs to, to determine a memory address for a data element for a work item.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processor when executing a graphics processing pipeline to generate an output, the graphics processing pipeline being executed comprising a plurality of pipeline stages, the method comprising:

when the graphics processor is executing a pipeline stage that generates a respective data element for each of a plurality of work items being processed by the pipeline stage:

storing the generated data elements as one or more work item packets, each work item packet configured for storing data elements for a first plurality of work items of the plurality of work items;

wherein the data elements in a work item packet are stored as one or more groups of N data elements in the work item packet;

the method further comprising, when storing a data element for a work item:

using an identifier for the work item configured such that a first part of the work item identifier indicates an offset for the group of N data elements that the data element for the work item belongs to relative to a base address, and a second, different part of the work item identifier indicates the relative position of the data element for the work item within the group of N data elements that the data element for the work item belongs to, to determine a memory address at which to store the data element for the work item; and storing the data element for the work item at the determined memory address.

2. The method of claim 1, wherein the pipeline stage is: a vertex shading stage, a geometry processing stage, a fragment processing stage, a compute shading stage, or a binning/tiling stage.

3. The method of claim 1, wherein the work items are vertices, and the data elements are positions for the vertices, or sets of one or more varyings for the vertices.

4. The method of claim 1, wherein the work items are primitives, and the data elements are sets of one or more attributes for the primitives.

5. The method of claim 1, wherein the work item packet stores plural different sets of groups of N data elements for a set of work items, the different sets of groups of N data elements being stored in an interleaved manner in the work item packet.

6. The method of claim 1, wherein the work item packet stores plural different sets of groups of N data elements for a set of work items, and the method comprises:

using the same identifier for a work item to determine the memory address for the data element for the work item in each of plural different sets of groups of N data elements for the set of work items in the work item packet; and using a different base address to determine the memory address for the data element for the work item for different sets of groups of N data elements for the set of work items in the work item packet.

7. The method of claim 1, wherein each group of N data elements is stored at a contiguous set of memory addresses, starting at a memory address that is aligned with the beginning of a cache line; and the first part of a work item identifier indicates a cache line offset from a base address.

8. The method of claim 1, wherein the same base address is used for plural work item packets.

9. The method of claim 1, comprising:

determining a base address to be used for determining the memory address for a work item packet or packets; and determining work item identifiers to be used to determine the memory addresses for data elements for work items in the work item packet based on the determined base address.

10. The method of claim 1, comprising determining the memory address for a data element as:

memory address for data element=base address+offset indicated by first part of work item identifier+(second part of work item identifier*stride)

where the stride is the (data) size of a data element in the group of data elements.

11. A method of operating a graphics processor when executing a graphics processing pipeline to generate an output, the graphics processing pipeline being executed comprising a plurality of pipeline stages, the method comprising:

when a data element for a work item is needed for a pipeline stage that uses data elements for each of a plurality of work items being processed by the pipeline stage, which data elements have been stored as one or more work item packets, each work item packet configured for storing data elements for a first plurality of work items of the plurality of work items, with the data elements in a work item packet being stored as one or more groups of N data elements in the work item packet:

using an identifier for the work item configured such that a first part of the work item identifier indicates an offset for the group of N data elements that the data element for the work item belongs to relative to a base address, and a second, different part of the work item identifier indicates the relative position of the data element for the work item within the group of N data elements that the data element for the work item belongs to, to determine a memory address from which to read the data element for the work item; and reading the data element for the work item from the determined memory address.

12. A graphics processor operable to execute a graphics processing pipeline comprising a plurality of pipeline stages to generate an output, the graphics processor comprising:

a first processing circuit configured to, when the graphics processor is executing a pipeline stage that generates a respective data element for each of a plurality of work items being processed by the pipeline stage:

store the generated data elements as one or more work item packets, each work item packet configured for storing data elements for a plurality of work items;

wherein the data elements in a work item packet are stored as one or more groups of N data elements in the work item packet;

and a second processing circuit, the second processing circuit being the same as or different from the first processing circuit, configured to, when storing a data element for a work item:

use an identifier for the work item configured such that a first part of the work item identifier indicates an offset for the group of N data elements that the data element for the work item belongs to relative to a base address, and a second, different part of the work item identifier indicates the relative position of the data element for the work item within the group of N data elements that the data element for the work item belongs to, to determine a memory address at which to store the data element for the work item; and a third processing circuit, the third processing circuit being the same as or different from the first processing circuit and/or the second processing circuit, configured to store the data element for the work item at the determined memory address.

13. The graphics processor of claim 12, wherein the pipeline stage is: a vertex shading stage, a geometry processing stage, a fragment processing stage, a compute shading stage, or a binning/tiling stage.

14. The graphics processor of claim 12, wherein the work items are vertices, and the data elements are positions for the vertices, or sets of one or more varyings for the vertices.

15. The graphics processor of claim 12, wherein the work items are primitives, and the data elements are sets of one or more attributes for the primitives.

16. The graphics processor of claim 12, wherein the work item packet stores plural different sets of groups of N data elements for a set of work items, the different sets of groups of N data elements being stored in an interleaved manner in the work item packet.

17. The graphics processor of claim 12, wherein the work item packet stores plural different sets of groups of N data elements for a set of work items, and the second processing circuit is configured to:

use the same identifier for a work item to determine the memory address for the data element for the work item in each of plural different sets of groups of N data elements for the set of work items in the work item packet; and use a different base address to determine the memory address for the data element for the work item for different sets of groups of N data elements for the set of work items in the work item packet.

18. The graphics processor of claim 12, wherein:

each group of N data elements is stored at a contiguous set of memory addresses, starting at a memory address that is aligned with the beginning of a cache line; and the first part of a work item identifier indicates a cache line offset from a base address.

19. The graphics processor of claim 12, wherein the same base address is used for plural work item packets.

20. The graphics processor of claim 12, comprising:

a fourth processing circuit, the fourth processing circuit being the same as or different from the first processing circuit and/or the second processing circuit and/or the third processing circuit, configured to:

determine a base address to be used for determining the memory address for a work item packet or packets; and determine work item identifiers to be used to determine the memory addresses for data elements for work items in the work item packet based on the determined base address.

21. The graphics processor of claim 12, wherein the second processing circuit is configured to:

determine the memory address for a data element as:

memory address for data element=base address+offset indicated by first part of work item identifier+(second part of work item identifier*stride)

where the stride is the (data) size of a data element in the group of data elements.

22. The graphics processor of claim 12, comprising:

a hardware controlled buffer configurable with the base address that is to be used for accessing data elements in a first work item packet of the work item packets, together with a data size for a data element; and configured to:

take as an input a first work item identifier for a first work item, and then determine the memory address for the data element for that first work item from the first work item identifier, base address and data element data size.

23. A graphics processor operable to execute a graphics processing pipeline comprising a plurality of pipeline stages to generate an output, the graphics processor comprising:

a first processing circuit configured to, when a data element for a work item is needed for a pipeline stage that uses data elements for each of a plurality of work items being processed by the pipeline stage, which data elements have been stored as one or more work item packets, each work item packet configured for storing data elements for a plurality of work items, with the data elements in a work item packet being stored as one or more groups of N data elements in the work item packet:

use an identifier for the work item configured such that a first part of the work item identifier indicates an offset for the group of N data elements that the data element for the work item belongs to relative to a base address, and a second, different part of the work item identifier indicates the relative position of the data element for the work item within the group of N data elements that the data element for the work item belongs to, to determine a memory address from which to read the data element for the work item; and a second processing circuit, the second processing circuit being the same as or different from the first processing circuit, configured to read the data element for the work item from the determined memory address.

* * * * *